US012226879B2

United States Patent
Smith et al.

(10) Patent No.: US 12,226,879 B2
(45) Date of Patent: Feb. 18, 2025

(54) PIPE FITTING TOOL

(71) Applicant: MILWAUKEE ELECTRIC TOOL CORPORATION, Brookfield, WI (US)

(72) Inventors: Benjamin A. Smith, Milwaukee, WI (US); James Wekwert, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 723 days.

(21) Appl. No.: 17/374,508

(22) Filed: Jul. 13, 2021

(65) Prior Publication Data

US 2022/0009059 A1 Jan. 13, 2022

Related U.S. Application Data

(60) Provisional application No. 63/061,455, filed on Aug. 5, 2020, provisional application No. 63/050,950, filed on Jul. 13, 2020.

(51) Int. Cl.
*B25B 21/00* (2006.01)
*B25B 23/00* (2006.01)

(52) U.S. Cl.
CPC ........ *B25B 21/002* (2013.01); *B25B 23/0085* (2013.01)

(58) Field of Classification Search
CPC .... B25B 21/002; B25B 23/0085; B25B 17/00
See application file for complete search history.

(56) References Cited

U.S. PATENT DOCUMENTS

| 2,514,374 A | 7/1950 | Cooper |
| 2,654,569 A | 10/1953 | Cooper |
| 2,753,744 A * | 7/1956 | Therien ................. E21B 19/168 81/182 |

(Continued)

FOREIGN PATENT DOCUMENTS

| CN | 203542513 U | 4/2014 |
| CN | 104265209 A | 1/2015 |

(Continued)

OTHER PUBLICATIONS

International Search Report and Written Opinion for Application No. PCT/US2021/041435 dated Oct. 26, 2021 (11 pages).

(Continued)

*Primary Examiner* — David B. Thomas
(74) *Attorney, Agent, or Firm* — Michael Best & Friedrich LLP

(57) ABSTRACT

A pipe fitting tool configured to loosen a first section of pipe with respect to a second section of pipe. The pipe fitting tool includes a motor, a reciprocating member that reciprocates in response to activation of the motor, a holdback assembly configured to clamp and hold the second section of pipe, and a loosening mechanism configured to clamp and rotate the first section of pipe with respect to the second section of pipe in response to a first linear motion of the reciprocating member, and to release the first section of pipe in response to a second linear motion of the reciprocating member, the second linear motion being in a direction opposite the first linear motion.

19 Claims, 17 Drawing Sheets

(56) References Cited

U.S. PATENT DOCUMENTS

| | | | | |
|---|---|---|---|---|
| 2,871,743 | A * | 2/1959 | Kelley | E21B 19/163 81/57.35 |
| 3,198,040 | A * | 8/1965 | Franck | B25B 21/005 81/55 |
| 3,426,417 | A | 2/1969 | Austin | |
| 3,500,708 | A * | 3/1970 | Wilson | E21B 19/163 81/57.35 |
| 3,653,115 | A | 4/1972 | Perkins | |
| 3,709,072 | A * | 1/1973 | Rogers | B25B 13/5016 81/57.2 |
| 3,880,024 | A * | 4/1975 | Asada | B25B 13/52 81/57.39 |
| 4,054,984 | A | 10/1977 | Ball et al. | |
| 4,345,493 | A * | 8/1982 | Rassieur | E21B 19/16 81/57.41 |
| 4,727,781 | A * | 3/1988 | Yuehui | E21B 19/163 91/519 |
| 4,729,269 | A * | 3/1988 | Killian | B25B 13/14 81/57.21 |
| 4,790,057 | A | 12/1988 | Baker | |
| 4,885,963 | A * | 12/1989 | Nishikawa | B25B 13/14 81/57.32 |
| 5,138,915 | A * | 8/1992 | Doll | B25B 13/5058 81/463 |
| 6,047,775 | A * | 4/2000 | Mock | E21B 19/163 166/85.1 |
| 6,775,890 | B2 | 8/2004 | Kolarik | |
| 7,059,424 | B2 * | 6/2006 | Neal | B25B 13/48 173/90 |
| 7,246,541 | B1 * | 7/2007 | Divack | B25B 13/5008 81/57.2 |
| 7,311,025 | B1 * | 12/2007 | Wilson, Jr. | B25B 23/145 81/429 |
| 7,997,166 | B2 * | 8/2011 | Lauzon | E21B 19/161 81/57.36 |
| 8,141,459 | B2 * | 3/2012 | Myburgh | B25B 21/00 81/57.14 |
| 8,261,454 | B2 * | 9/2012 | Wilson, Jr. | B25B 21/002 30/95 |
| 8,438,955 | B2 * | 5/2013 | Wilson, Jr. | B25B 21/002 81/57.36 |
| 8,490,519 | B2 | 7/2013 | LaValley et al. | |
| 8,973,244 | B2 | 3/2015 | LaValley et al. | |
| 8,978,226 | B2 | 3/2015 | Kady et al. | |
| 9,334,987 | B2 | 5/2016 | Hofmann | |
| 9,493,996 | B2 | 11/2016 | LaValley et al. | |
| 9,782,876 | B2 * | 10/2017 | Francis | E21B 19/163 |
| 10,093,000 | B2 | 10/2018 | Donaldson et al. | |
| 10,125,556 | B1 | 11/2018 | Erdman, Jr. | |
| 10,139,024 | B2 | 11/2018 | Hofmann | |
| 10,160,101 | B2 | 12/2018 | Donaldson et al. | |
| 10,184,304 | B2 | 1/2019 | LaValley et al. | |
| 10,344,892 | B2 | 7/2019 | LaValley et al. | |
| 10,442,064 | B2 | 10/2019 | Hofmann | |
| 10,518,393 | B2 * | 12/2019 | Francis | E21B 19/163 |
| 10,689,925 | B2 | 6/2020 | Angelle et al. | |
| 11,167,397 | B1 * | 11/2021 | Francis | B25B 21/005 |
| 2008/0128172 | A1 * | 6/2008 | Tjader | B25B 13/50 175/57 |
| 2008/0230972 | A1 | 9/2008 | Ganley | |
| 2010/0269638 | A1 | 10/2010 | Wilson, Jr. et al. | |
| 2011/0138969 | A1 * | 6/2011 | Gouws | E21B 19/163 81/57.33 |
| 2016/0160588 | A1 | 6/2016 | LaValley et al. | |
| 2018/0104799 | A1 * | 4/2018 | Francis | B25B 21/002 |
| 2019/0106951 | A1 | 4/2019 | LaValley et al. | |
| 2019/0277428 | A1 | 9/2019 | LaValley et al. | |

FOREIGN PATENT DOCUMENTS

| | | |
|---|---|---|
| CN | 108128697 A | 6/2018 |
| DE | 2433946 C3 | 2/1976 |
| DE | 3510299 C1 | 9/1986 |
| DE | 29612635 U1 | 4/1997 |
| DE | 10062864 A1 | 6/2002 |
| DE | 102005005233 A1 | 8/2006 |
| DE | 202012000584 U1 | 4/2013 |
| EP | 1116859 B1 | 6/2006 |
| EP | 1979572 B1 | 11/2009 |
| GB | 2230988 A | 11/1990 |
| JP | H0285570 U | 7/1990 |
| JP | 2502973 Y2 | 6/1996 |
| KR | 1020170022468 A | 3/2017 |
| KR | 101915230 B1 | 11/2018 |

OTHER PUBLICATIONS

Extended European Search Report for Application No. 21841698.0 dated Jul. 12, 2024 (5 pages).

* cited by examiner

PIPE FITTING TOOL

CROSS-REFERENCE TO RELATED APPLICATIONS

This application claims priority to co-pending U.S. Provisional Patent Application No. 63/050,950, filed on Jul. 13, 2020, and to co-pending U.S. Provisional Patent Application No. 63/061,455, filed Aug. 5, 2020, the entire content of each of which is incorporated herein by reference.

FIELD OF THE INVENTION

The present invention relates to power tools, and more particularly to pipe fitting tools.

BACKGROUND OF THE INVENTION

Pipe fitting tools are used to connect and disconnect pipes, which often use threaded joints to connect to each other.

SUMMARY OF THE INVENTION

The present invention provides, in one aspect, a pipe fitting tool configured to loosen a first section of pipe with respect to a second section of pipe. The pipe fitting tool includes a motor, a reciprocating member that reciprocates in response to activation of the motor, a holdback assembly configured to clamp and hold the second section of pipe, and a loosening mechanism configured to clamp and rotate the first section of pipe with respect to the second section of pipe in response to a first linear motion of the reciprocating member, and to release the first section of pipe in response to a second linear motion of the reciprocating member, the second linear motion being in a direction opposite the first linear motion.

In some embodiments, the pipe fitting tool includes a housing containing the motor and a battery removably coupled to the housing. The battery is configured to provide power to the motor.

In some embodiments, the holdback assembly includes a first pair of jaws, and the loosening mechanism includes a second pair of jaws.

In some embodiments, the holdback assembly is adjustably positioned relative to the loosening mechanism.

In some embodiments, the loosening mechanism includes a screw rotatably driven by the motor to clamp and rotate the first section of pipe.

The present invention provides, in another aspect, a pipe fitting tool configured to loosen a first section of pipe with respect to a second section of pipe. The pipe fitting tool includes a motor, a lead screw configured to rotate in response to receiving torque from the motor, a carriage configured to move along the lead screw between a first position and a second position in response to rotation of the lead screw, a holdback assembly configured to clamp and hold the second section of pipe, and a jaw assembly. The jaw assembly is configured to clamp and rotate the first section of pipe with respect to the second section of pipe in response to movement of the carriage from the first position to the second position, and to release the first section of pipe in response to movement of the carriage from the second position to the first position.

In some embodiments, the holdback assembly includes a first jaw and a second jaw movable relative to the first jaw.

In some embodiments, the holdback assembly includes a handle, and a spacing between the first jaw and the second jaw is decreased in response to movement of the handle to clamp and hold the second section of pipe.

In some embodiments, the holdback assembly includes a drive shaft coupled to the handle and a pinion coupled for co-rotation with the drive shaft, and the drive shaft is configured to rotate in response to movement of the handle.

In some embodiments, the holdback assembly includes a first rack gear meshed with the pinion and coupled to the first jaw and a second rack gear meshed with the pinion and coupled to the second jaw such that rotation of the pinion causes the first and second jaws to move in opposite directions.

In some embodiments, the pipe fitting tool includes a removable battery configured to power the motor.

In some embodiments, the jaw assembly includes a first jaw and a second jaw movable relative to the first jaw, and the first jaw is biased toward the second jaw.

In some embodiments, the holdback assembly is adjustably positionable relative to the jaw assembly.

In some embodiments, the holdback assembly includes a track to guide movement of the jaw assembly relative to the holdback assembly.

In some embodiments, the pipe fitting tool includes a post extending parallel to the lead screw, and the carriage includes a sleeve slidable along the post to guide movement of the carriage.

In some embodiments, the motor includes an output shaft extending parallel to the lead screw.

The present invention provides, in another aspect, a method of loosening a first section of pipe with respect to a second section of pipe, including positioning first and second jaws of a holdback assembly on opposite sides of the second section of pipe, positioning third and fourth jaws of a drive assembly on opposite sides of the first section of pipe, rotating a handle of the holdback assembly in a tightening direction to clamp the second section of pipe between the first and second jaws, and performing a loosening operation including activating a motor of the drive assembly in a loosening direction to cause the third and fourth jaws to clamp the first section of pipe between the third and fourth jaws and continuing to operate the motor in the loosening direction to cause the third and fourth jaws to rotate the first section of pipe relative to the second section of pipe.

In some embodiments, the method includes performing a resetting operation after the loosening operation, the resetting operation including reversing an operating direction of the motor to cause the third and fourth jaws to release the first section of pipe.

In some embodiments, the method includes repeating the loosening operation after the resetting operation.

In some embodiments, rotating the handle of the holdback assembly includes rotating a pinion meshed with a first rack coupled to the first jaw and a second rack coupled to the second jaw.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
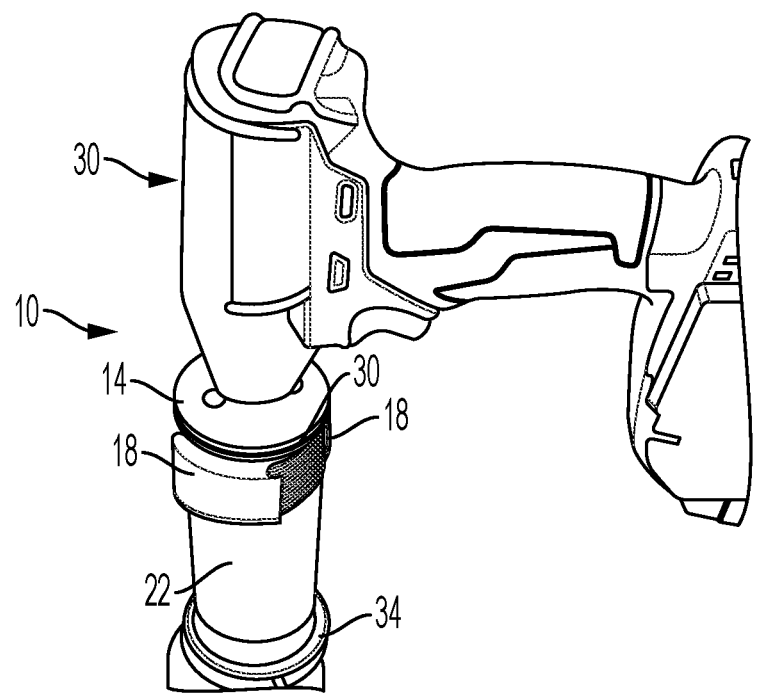
FIG. 1 is perspective view of a pipe fitting apparatus according to one embodiment, for use with a rotary power tool such as an impact tool.
Figure 2:
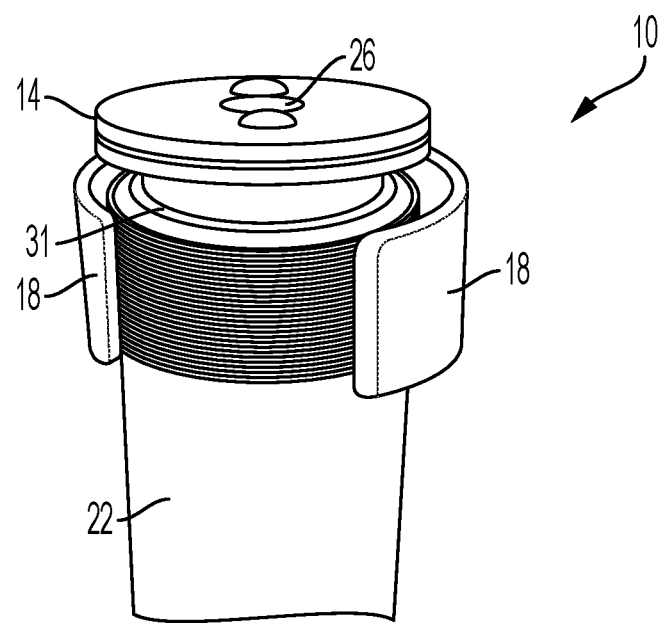
FIG. 2 is a perspective view of the pipe fitting apparatus of FIG. 1.

FIGS. 1 and 2 illustrate a pipe fitting apparatus 10 according to one embodiment. The pipe fitting apparatus 10 includes a drive member 14 and a plurality of circumferential clamping members 18 that are coupled to the drive member 14 and configured to surround and apply a radial clamping force to a first section of pipe 22, in order to loosen the first section of pipe 22 relative to a second section of pipe 34, as described in further detail below. The clamping members 18 are initially biased toward each other by an internal biasing mechanism (not shown), prior to the operation beginning. The drive member 14 includes an aperture 26 to receive, e.g., a bit of a rotary power tool 30, such as an impact driver or drill-driver.

In operation, the clamping members 18 are slid axially over an end 31 of the first section of pipe 22 and retained on the first section of pipe 22 via the internal biasing mechanism. The bit of the rotary power tool is then inserted into the aperture 26, which keys to the bit so as to transfer torque from the bit to the drive member 14. The operator then activates the power tool 30 to rotate the bit, thus rotating the drive member 14.

Rotation of the drive member 14 causes the clamping members 18 to cam towards each other and rotate with the drive member 14, thus applying a radial clamping force on the first section of pipe 22. With the first section of pipe 22 now clamped to the drive member 14, the rotation of the drive member 14 causes the first section of pipe 22 to rotate with respect to the second section of pipe 34 (which is fixed in place, such as by a pipe clamp), thus allowing the first section of pipe 22 to be loosened with respect to and removed from the second section of pipe 34. In some embodiments, the diameter between the clamping members 18 is increased or decreased to accommodate pipes of different diameters. The pipe fitting apparatus 10 advantageously allows an operator to leverage the existing power tool 30 to loosen and/or remove the first section of pipe 22, and to maintain the interior threading of the first section of pipe 22. However, in some embodiments, the pipe fitting apparatus 10 may be integrated with the power tool 30.

Figure 3:
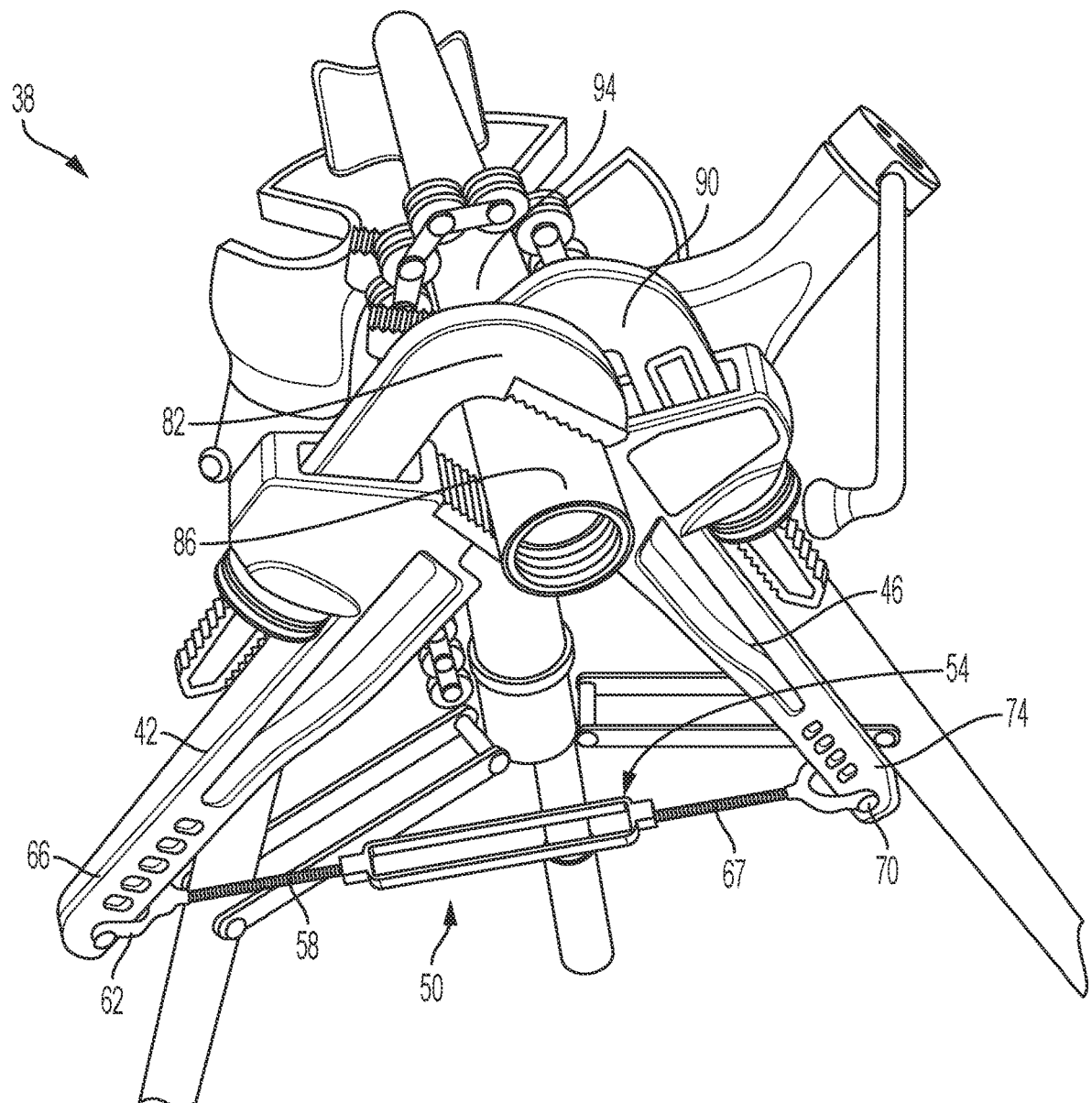
FIG. 3 is a perspective view of a pipe fitting assembly according to another embodiment.
Figure 4:
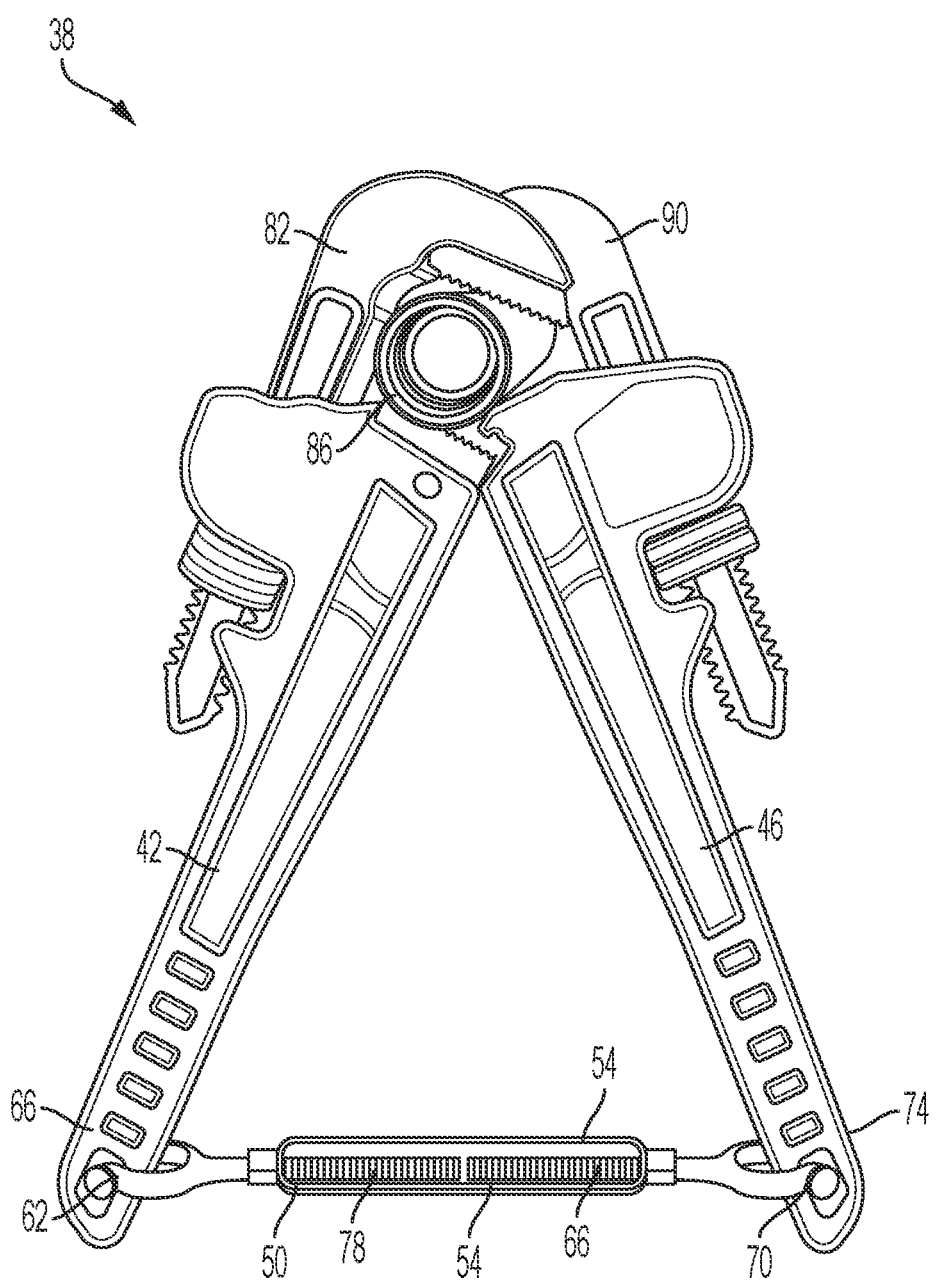
FIG. 4 is another perspective view of the pipe fitting assembly of FIG. 3.

FIGS. 3-4 illustrate a pipe fitting assembly 38 according to another embodiment and including a first pipe wrench 42, a second pipe wrench 46, and a tensioning mechanism 50 extending between and interconnecting the first and second pipe wrenches 42, 46. In the embodiment illustrated in FIGS. 3 and 4, the tensioning mechanism 50 includes a turnbuckle 54 with a first, right-hand threaded rod 58 having a first end 62 coupled to an end 66 of the first pipe wrench 42, and a second, left-hand threaded rod 67 having a second end 70 coupled to an end 74 of the second pipe wrench 46. In the illustrated embodiment, the first and second ends 62, 70 each include a C-clip with a pin to respectively couple to the ends 66, 74 of the first and second pipe wrenches 42, 46.

The first and second threaded rods 58, 67 of the turnbuckle 54 are threadably coupled to a body piece 78 (FIG. 4). In operation, a clamping end 82 of the first pipe wrench 42 is clamped on a first section of pipe 86, and a clamping end 90 of the second pipe wrench 46 is clamped on a second section of pipe 94, as shown in FIG. 3. The body piece 78 is then rotated, causing the first and second threaded rods 58, 66 to move toward each other. As the first and second threaded rods 58, 66 move toward each other, the end 66 of the first pipe wrench 42 is moved toward the end 74 of the second pipe wrench 46, and thus the first pipe section 86 is loosened with respect to the second section of pipe 94.

Figure 5:
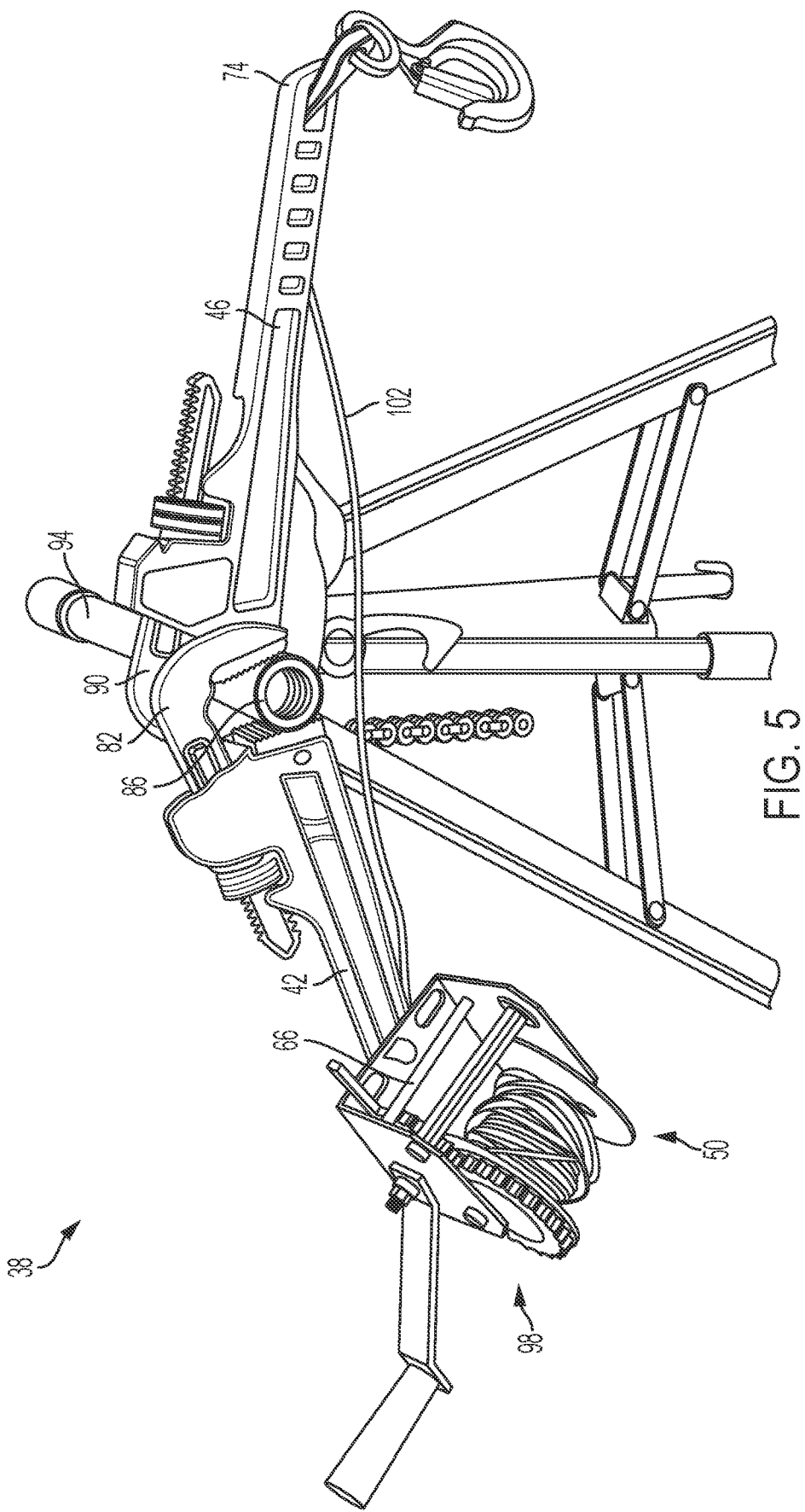
FIG. 5 is a perspective view of a pipe fitting assembly according to another embodiment.

FIG. 5 illustrates another embodiment of the pipe fitting assembly 38, with the turnbuckle 54 of the tensioning mechanism 50 replaced by a winch 98 coupled to the end 66 of the first pipe wrench 42, with a cable 102 of the winch 98 coupled to the end 74 of the second pipe wrench 46. In operation, the clamping end 82 of the first pipe wrench 42 is clamped on the first section of pipe 86, and the clamping end 90 of the second pipe wrench 46 is clamped on the second section of pipe 94. The winch 98 is then used to retract the cable 102, moving the end 66 of the first pipe wrench 42 toward the end 74 of the second pipe wrench 46, thus loosening the first section of pipe 86 with respect to the second section of pipe 94.

Figure 6:
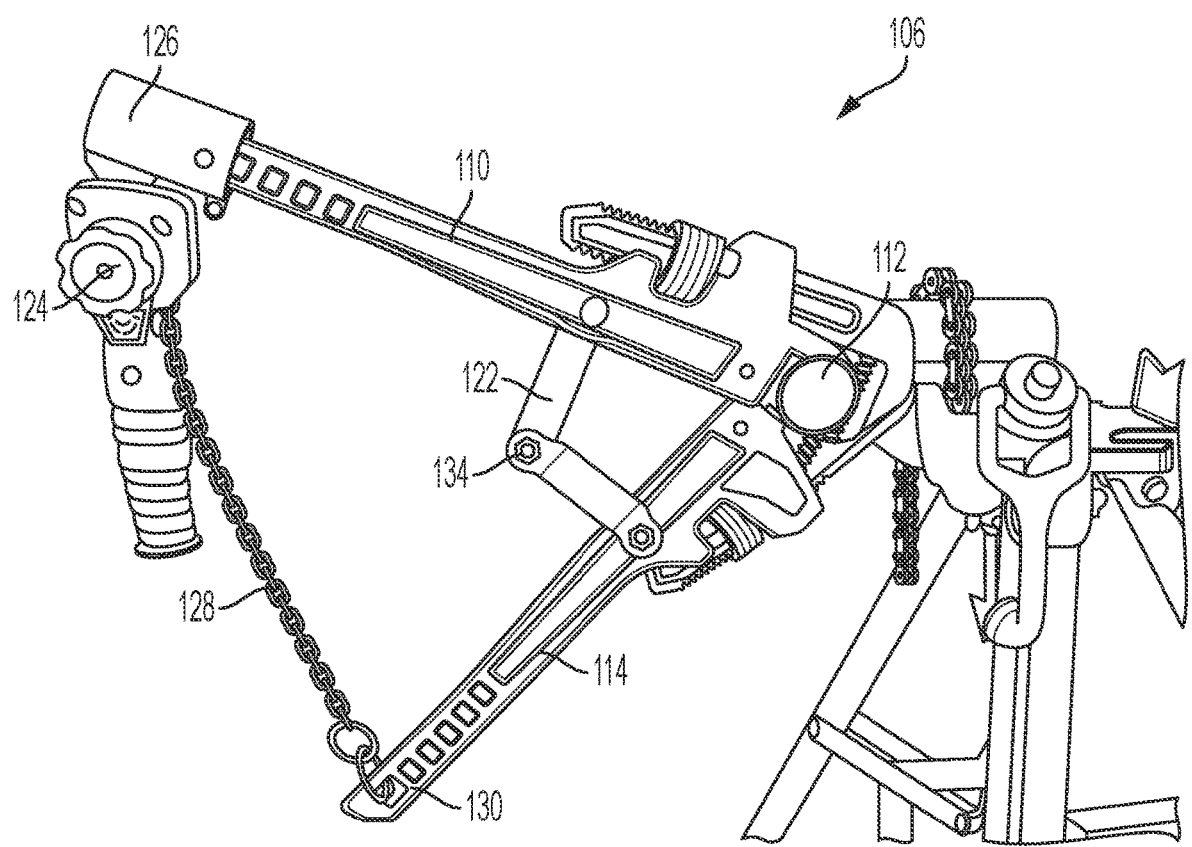
FIG. 6 is a perspective view of a pipe fitting apparatus according to another embodiment.

FIG. 6 illustrates a pipe fitting apparatus 106 according to another embodiment. The pipe fitting apparatus 106 includes a first pipe wrench 110 coupled to a first section of pipe 112 and a second pipe wrench 114 coupled to a second section of pipe (not shown). A pivoting linkage 122 couples the first pipe wrench 110 to the second pipe wrench 114. The pipe fitting apparatus 106 further includes a motor 124 coupled to a first end 126 of the first pipe wrench 110, and a chain 128 extending between the motor 124 and a second end 130 of the second pipe wrench 114.

In operation, the operator clamps the first pipe wrench 110 on the first section of pipe 112 and the second pipe wrench 114 on the second section of pipe. The pivoting linkage 122 assists an operator during this setup process by maintaining the two wrenches 110, 114 at a desired orientation. Specifically, while gravity allows the first pipe wrench 110 to be initially secured onto the first section of pipe and apply a moment thereto in a first rotational direction, the second pipe wrench 114 is secured onto the second section of pipe and initially applies a moment thereto in a second rotational direction that is opposite the first rotational direction, via the linkage 122, which keeps the second pipe wrench 114 at a predetermined location with respect to the first pipe wrench 110. The operator then activates the motor 124 to retract the chain 128, thus pulling the first end 126 of the first pipe wrench 110 toward the second end 130 of the second pipe wrench 114, thus loosening the first section of pipe 112 with respect to the second section of pipe. As the first end 126 moves toward the second end 130, the pivoting linkage 122 closes in a scissor-like motion about a pivot point 134.

Figure 7:
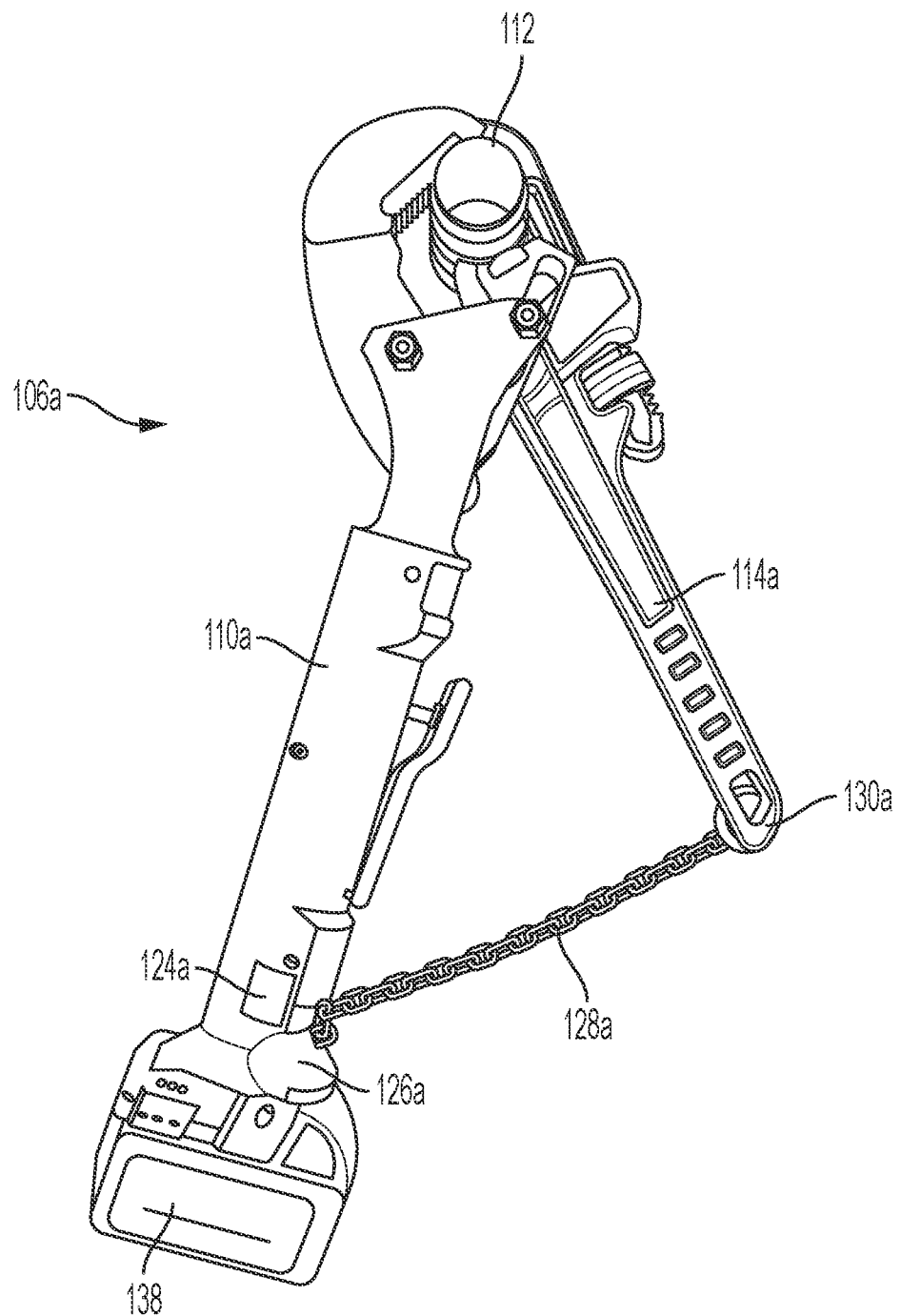
FIG. 7 is a perspective view of a pipe fitting apparatus, according to another embodiment.

FIG. 7 illustrates another embodiment of a pipe fitting apparatus 106a that is similar to the pipe fitting apparatus 106 described above with reference to FIG. 6, with like parts having corresponding reference numerals appended with the letter "a," and differences explained below. Instead of an external motor 124 coupled to the first end 126a of the first pipe wrench 110a, the first pipe wrench 110a includes an internal motor 124a (shown schematically), and a battery 138 to provide power thereto. Also, the pivoting linkage 122 is omitted from the pipe fitting apparatus 106a.

Figure 8:
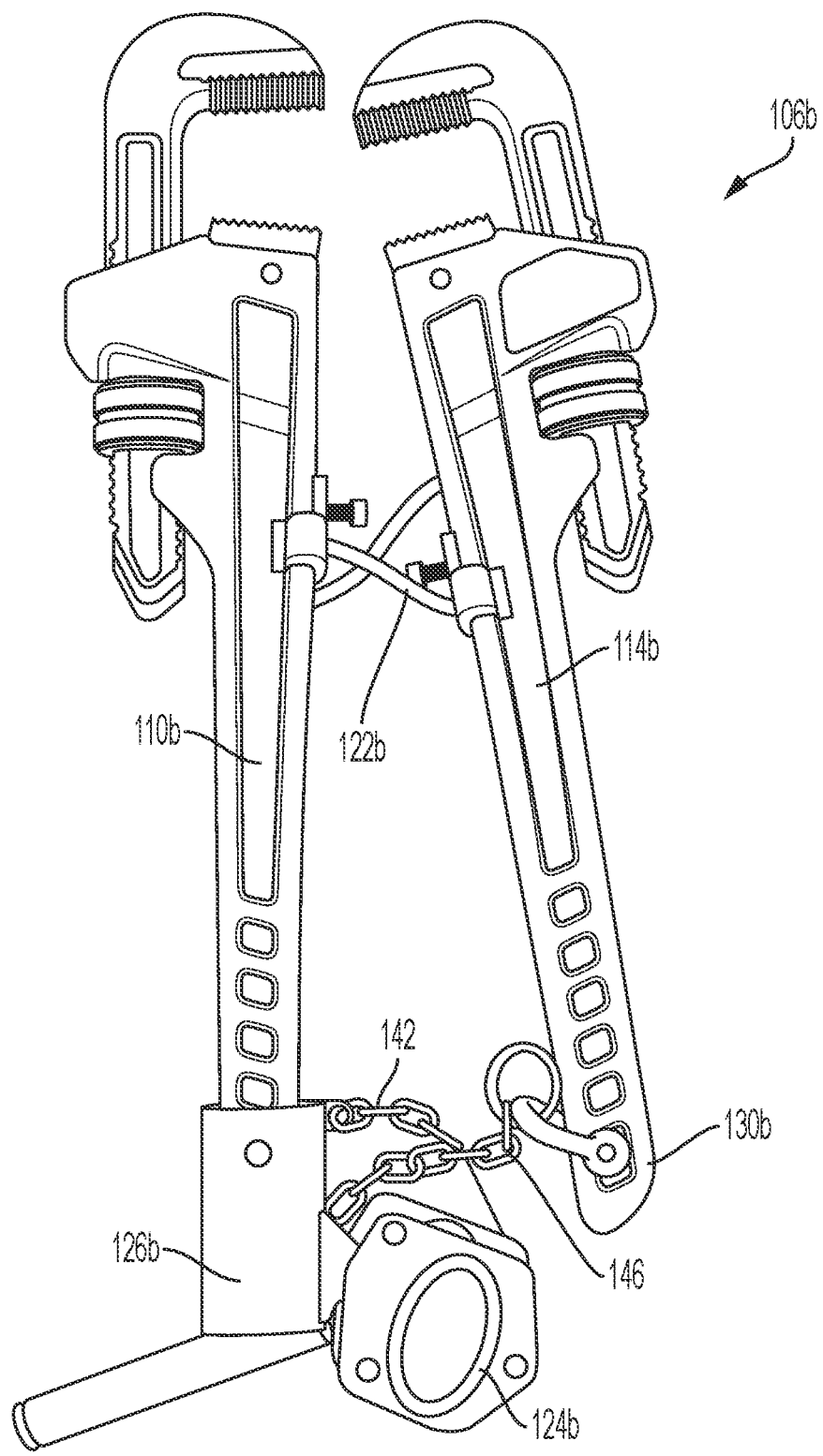
FIG. 8 is a perspective view of a pipe fitting apparatus, according to another embodiment.

FIG. 8 illustrates another embodiment of a pipe fitting apparatus 106b that is similar to the pipe fitting apparatus 106 described above with reference to FIG. 6, with like parts having corresponding reference numerals appended with the letter "b," and differences explained below. Instead of a rigid, pivoting linkage 122, the pipe fitting apparatus 106b includes a flexible linkage 122b. The flexible linkage 122b may include, for example, a cable made from steel, nylon, or any other suitable material connected to the respective pipe wrenches 110b, 114b. Instead of a motor 124 attached to the first end 126b of the first pipe wrench 110, the motor 124b is arranged between the first and second ends 126b, 130b, with a first chain 142 coupled to the first end 126b and a second chain 146 coupled to the second end 130b. The motor 124 is operable to retract the chains 142, 146 (which, in some embodiments, may be end portions of a single chain), to thereby move the first end 126b toward the second end 130b.

Figure 9:
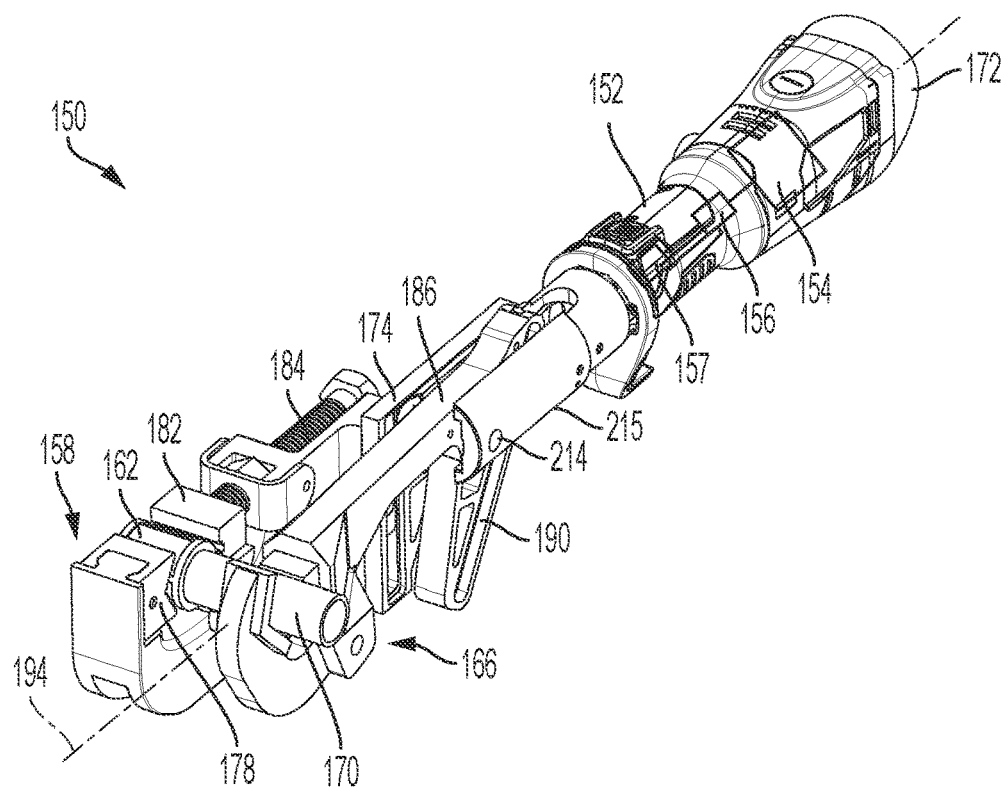
FIG. 9 is a perspective view of a pipe fitting tool according to another embodiment.

FIG. 9 illustrates a pipe fitting tool 150 according to another embodiment of the present disclosure and including a housing 152, a motor 154 supported within the housing 152, a transmission 156 (e.g., a planetary transmission) coupled to an output of the motor 154, and a linear output member 157, which may include a hydraulic or pneumatic piston driven via a pump coupled to an output of the transmission 156, a power screw, or any other suitable mechanism, driven to move linearly along a longitudinal axis 194 of the housing 152 in response to activation of the motor 154. The motor 154, transmission 156, and output member 157 are illustrated schematically in FIG. 9, and it should be understood that these components may be arranged, supported, and interconnected in various ways. The illustrated pipe fitting tool 150 further includes a holdback assembly 158 configured to clamp and hold a second section of pipe 162, and a pipe loosening mechanism 166 configured to loosen a first section of pipe 170 with respect to the second section of pipe 162 in response to reciprocation of the output member 157, as explained in further detail below.

In the illustrated embodiment, a battery 172 (e.g., a removable power tool battery back having a nominal output voltage of 18 volts) provides power to the motor 154. The holdback assembly 158 includes a frame 174 coupled to the housing 152 and having a static (i.e. fixed) first vice jaw 178. In the illustrated embodiment, the frame 174 is fixed to the housing 152 but in other embodiments, the frame 174, and thus the holdback assembly 158, may be adjustable with respect to the housing 152. A moveable second vice jaw 182 of the holdback assembly 158 is moveable with respect to the frame 174 via rotation of a screw 184 threaded through the frame 174. The second vice jaw 182 is thereby able to move toward and away from the first vice jaw 178, allowing the holdback assembly 158 to clamp and secure sections of pipes having different diameters.

Figure 10:
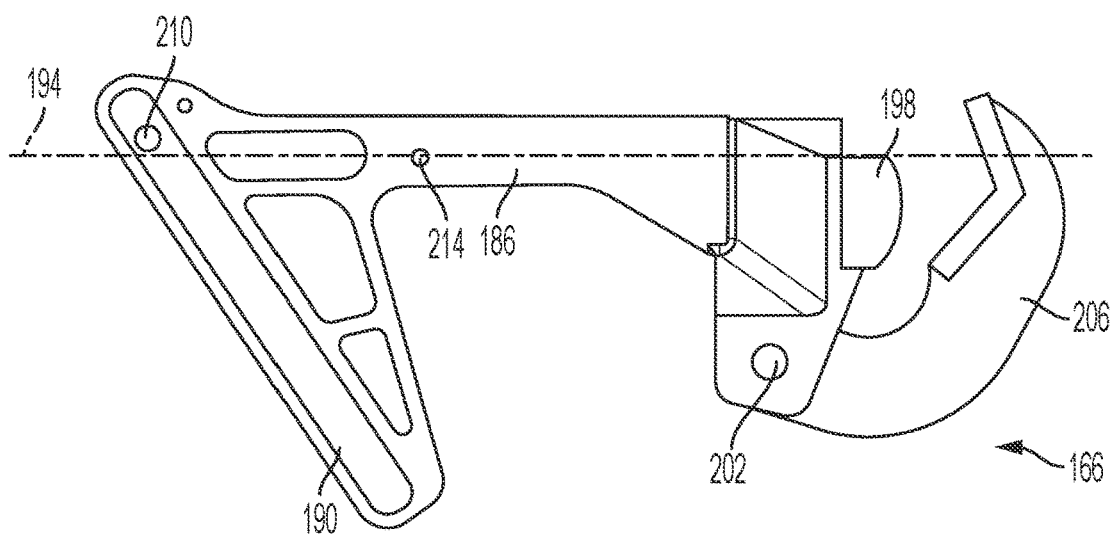
FIG. 10 is a plan view of a loosening mechanism of the pipe fitting tool of FIG. 9.

As shown in FIG. 10, the loosening mechanism 166 includes a linkage 186 having a slot 190 arranged obliquely with respect to an axis of reciprocation 194 of the output member 157. The linkage 186 also includes a first clamping jaw 198 and a pivot point 202. A second clamping jaw 206 is pivotally coupled to the first clamping jaw 198 via the pivot point 202. In operation, the second section of pipe 162 is clamped between the first and second vice jaws 178, 182 of the holdback assembly 158, and the first section of pipe 170 is arranged between the first and second clamping jaws 198, 206 of the loosening mechanism 166. The motor 154 is then activated, causing reciprocation of the output member 157. A crosswise pin 210 (FIG. 10), coupled to the output member 157, is arranged in the slot 190 of the linkage 186 and thus, in response to reciprocation of the output member 157, the loosening mechanism 166 repeatedly undergoes two separate motions.

First, with reference to the orientation illustrated in FIG. 10, as the output member 157 and crosswise pin 210 moves from left to right in an expanding motion, due to the arrangement of the crosswise pin 210 in the slot 190, the linkage 186 is caused to pivot clockwise about a pivot point 214, where the linkage 186 is pivotally coupled to a clevis 215 of the housing 152 (FIG. 9). As the linkage 186 pivots clockwise, the second clamping jaw 206 is moved toward the first clamping jaw 198 by pivoting about the pivot point 202, thus clamping the first section of pipe 170 and rotating it in a loosening direction with respect to the second section of pipe 162.

Second, as the output member 157 and crosswise pin 210 move from right to left, in a retracting motion, the pin 210 bears against the slot 190 to cause the linkage 186 to pivot counterclockwise about the pivot point 214. As the linkage 186 pivots counterclockwise, the second clamping jaw 206 is moved away from the first clamping jaw 198 by pivoting about the pivot point 202, such that the clamping force on the first section of pipe 170 is released, and the first clamping jaw 198 rotates to a new position about the first section of pipe 170 in preparation for a subsequent loosening cycle. As the output member 157 continues to reciprocate and these two motions of the loosening mechanism 166 are incrementally repeated in continuous succession, the first section of pipe 170 is progressively loosened from the second section of pipe 162.

Figure 11:
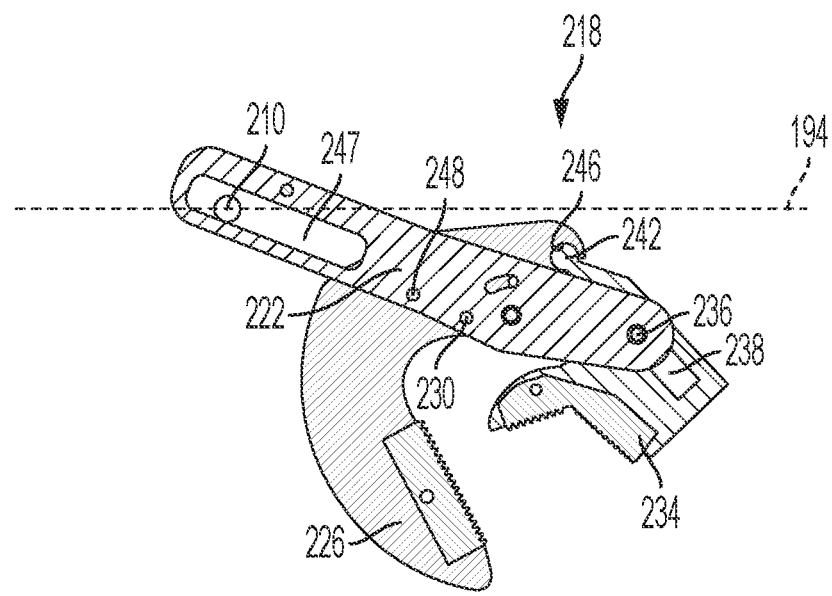
FIG. 11 is a cross-sectional view of an alternative loosening mechanism for the pipe fitting tool of FIG. 9.

FIG. 11 illustrates an alternative loosening mechanism 218, which may be used with the pipe fitting tool 150 instead of loosening mechanism 166. The loosening mechanism 218 includes a linkage 222, a first clamping jaw 226 coupled to the linkage 222 via a crosswise pin 230, and a second clamping jaw 234 coupled to the linkage 222 via a pin 236 in a slot 238 and rotatably coupled to the first clamping jaw 226 via a circular segment 242 in a circular recess 246. As described below, in response to reciprocation of the output member 157, the loosening mechanism 218 repeatedly undergoes two separate motions.

First, in the frame of reference of FIG. 11, as the output member 157 and crosswise pin 210 moves from left to right in an expanding motion, due to the arrangement of the crosswise pin 210 in a slot 247 of the linkage 222, the linkage 222 is caused to pivot clockwise about a pivot point 248 coupled to the housing 152. As the linkage 222 pivots clockwise, the second clamping jaw 234 is pivoted towards the first clamping jaw 226 about a pivot point defined by the circular segment 242 and recess 246, thus clamping the first section of pipe 170 between the jaws 226, 234. Once the first section of pipe 170 is clamped, further movement of the output member 157 from left to right causes the jaws 226, 234 to rotate together in a clockwise direction, thereby rotating the first section of pipe 170 in a loosening direction with respect to the second section of pipe 162.

Second, in the frame of reference of FIG. 11, due to the arrangement of the crosswise pin 210 in the slot 247 of the linkage 222, as the output member 157 and crosswise pin 210 move from right to left in a retracting motion, the linkage 222 is caused to pivot counterclockwise about the pivot point 242, 246. As the linkage 222 pivots counterclockwise, the second clamping jaw 234 is moved away from the first clamping jaw 226, such that the clamping force on the first section of pipe 170 is released, such that the first section of pipe 170 is not rotated in a tightening direction with respect to the second section of pipe 162 during retraction of the crosswise pin 210.

Figure 12:
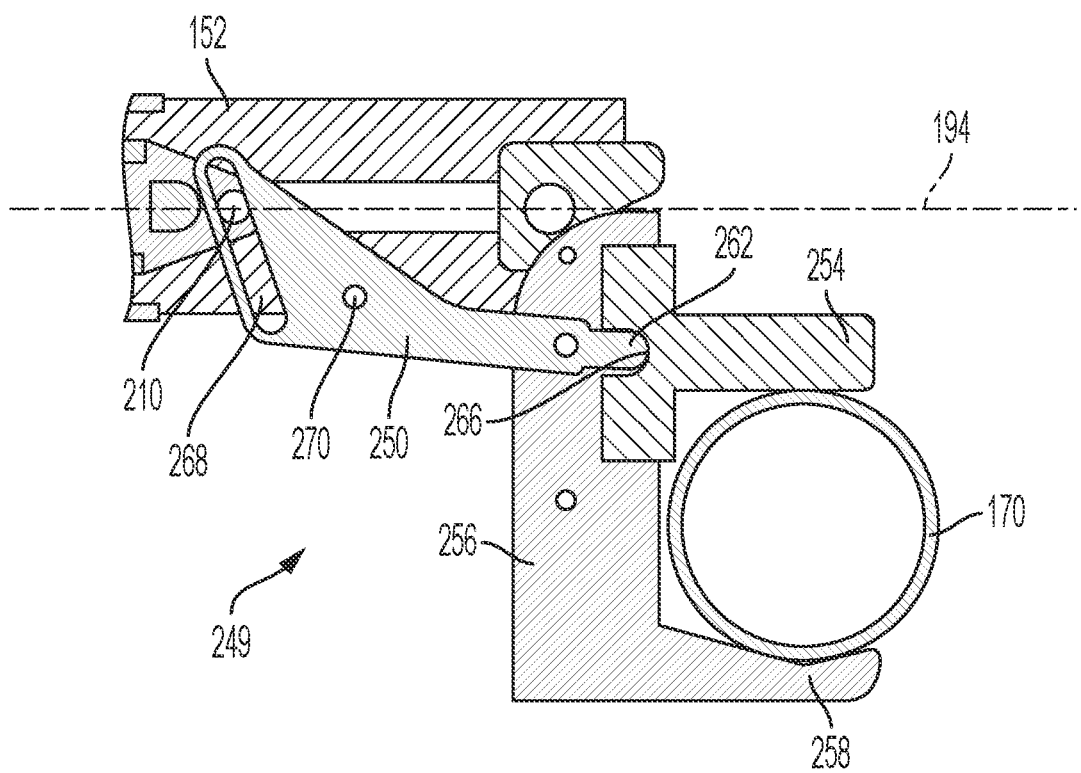
FIG. 12 is a cross-sectional view of an alternative loosening mechanism for the pipe fitting tool of FIG. 9.

FIG. 12 illustrates an alternative loosening mechanism 249, which may be used with the pipe fitting tool 150 instead of loosening mechanism 166. The loosening mechanism 249 includes a linkage 250 and a first clamping jaw 254 translatable along a body 256 of a second clamping jaw 258. An extension 262 of the linkage 250 is arranged in a notch 266 of the first clamping jaw 254. The second clamping jaw 258 is pivotally coupled to the linkage 250. In response to reciprocation of the output member 157, the loosening mechanism 249 repeatedly undergoes two separate motions, as described below.

First, in the frame of reference of FIG. 12, as the output member 157 and crosswise pin 210 move from left to right in an expanding motion, due to the arrangement of the crosswise pin 210 in a slot 268 of the linkage 250, the linkage 250 is caused to pivot clockwise about a pivot point 270 coupled to the housing 152. As the linkage 250 pivots clockwise, the body 256 of the second clamping jaw 258 pivots therewith and the first clamping jaw 254 moves downwards along the body 256 toward the second clamping jaw 258, due to the extension 262 pushing the notch 266 in a downward direction. Once the first section of pipe 170 is clamped, further movement of the output member 157 from left to right causes the jaws 258, 254 to rotate together in a clockwise direction, thereby rotating the first section of pipe 170 in a loosening direction with respect to the second section of pipe 162. Thus, the first section of pipe 170 is clamped and rotated in a loosening direction it with respect to the second section of pipe 162.

Second, in the frame of reference of FIG. 12, as the output member 157 and crosswise pin 210 move from right to left in a retracting motion, due to the arrangement of the crosswise pin 210 in the slot 268 of the linkage 250, the linkage 222 is caused to pivot counterclockwise about the pivot point 270. As the linkage 222 pivots counterclockwise, the second clamping jaw 258 rotates therewith, and the first clamping jaw 254 moves along the body 256 away from the second clamping jaw 258, due to the extension 262 pushing the notch 266 in an upward direction. Thus, the clamping force on the first section of pipe 170 is released, such that the first section of pipe 170 is not rotated in a tightening direction with respect to the second section of pipe 162 during retraction of the crosswise pin 210.

Figure 13:
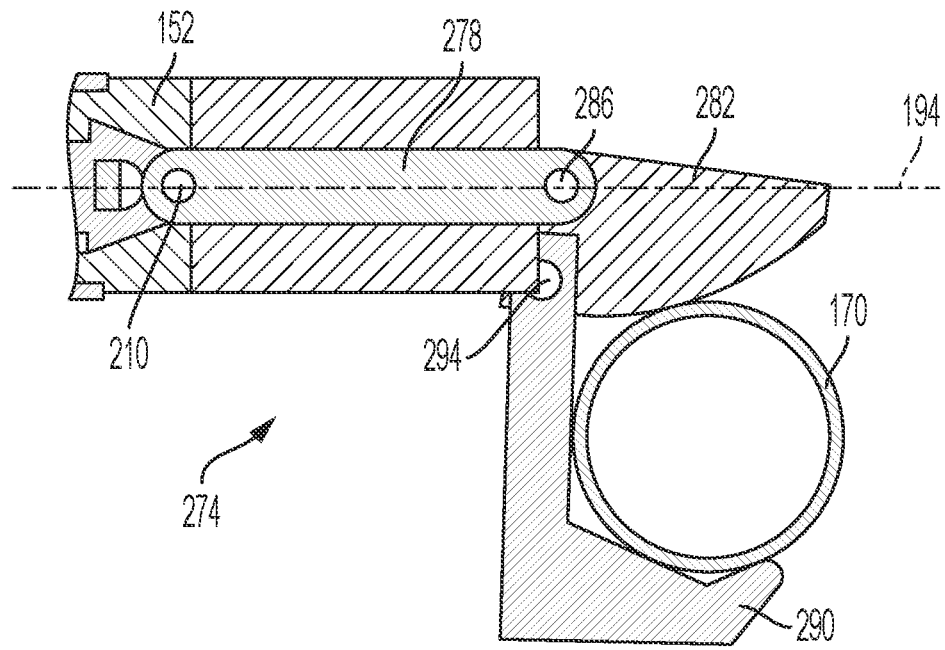
FIG. 13 is a cross-sectional view of an alternative loosening mechanism for the pipe fitting tool of FIG. 9.

FIG. 13 illustrates an alternative loosening mechanism 274, which may be used with the pipe fitting tool 150 instead of loosening mechanism 166. The loosening mechanism 274 includes a linkage 278 and a first clamping jaw 282 pivotable about a pivot point 286 at which the first clamping jaw 282 is pivotally coupled to the linkage 278. The first clamping jaw 282 is also pivotably coupled to a second clamping jaw 290 at a pivot point 294. In response to reciprocation of the output member 157, the loosening mechanism 274 repeatedly undergoes two separate motions, as described in greater detail below.

First, with frame of reference of FIG. 13, as the output member 157 and crosswise pin 210 moves from left to right in an expanding motion, the linkage 250 moves from left to right, causing the first clamping jaw 282 to pivot clockwise about the coupling point 286 and the pivot point 294 until the first clamping jaw 282 clamps the first section of pipe 170, at which point the first and second clamping jaws 282, 290 pivot clockwise together about the coupling point 286. Thus, the first section of pipe 170 is clamped and rotated in a loosening direction with respect to the second section of pipe 162.

Second, with frame of reference of FIG. 13, as the output member 157 crosswise pin 210 moves from right to left in a retracting motion, the linkage 250 moves from right to left. As the linkage 250 moves left, the first clamping jaw 282 pivots clockwise about the pivot point 294 until the first clamping jaw 282 releases the first section of pipe 170, at which point the first and second clamping jaws 282, 290 pivot counterclockwise about the coupling point 286. Thus, the clamping force on the first section of pipe 170 is released, such that the first section of pipe 170 is not rotated in a tightening direction with respect to the second section of pipe 162 during retraction of the crosswise pin 210.

Figure 14:
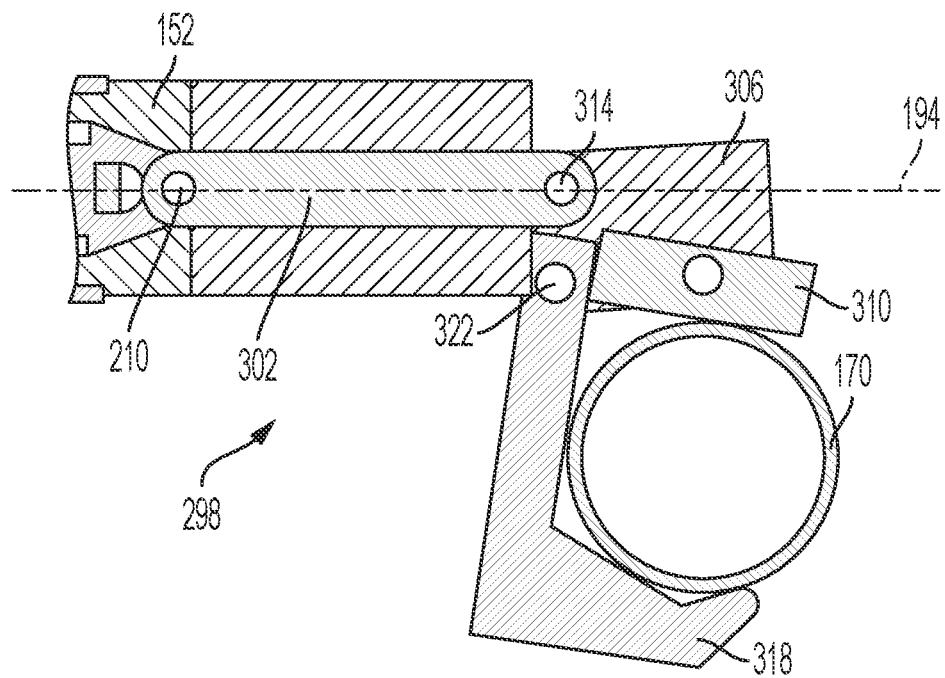
FIG. 14 is a cross-sectional view of an alternative loosening mechanism for the pipe fitting tool of FIG. 9.

FIG. 14 illustrates an alternative loosening mechanism 298, which may be used with the pipe fitting tool 150 instead of loosening mechanism 166. The loosening mechanism 298 includes a linkage 302 and a first clamping jaw 306 having a jaw portion 310. The first clamping jaw 306 is pivotable about a coupling point 314 where the first clamping jaw 306 is coupled to the linkage 302. The first clamping jaw 306 is also pivotably coupled to a second clamping jaw 318 at a pivot point 322. In response to reciprocation of the output member 157, the loosening mechanism 298 repeatedly undergoes two separate motions, as described below.

First, in the frame of reference of FIG. 14, as the output member 157 and crosswise pin 210 move from left to right in an expanding motion, the linkage 302 moves from left to right, causing the first clamping jaw 306 to pivot clockwise about the coupling point 314 and the pivot point 322 until the jaw portion 310 clamps the first section of pipe 170, at which point the first and second clamping jaws 306, 318 pivot clockwise together about the coupling point 314. Thus, the first section of pipe 170 is clamped rotated in a loosening direction with respect to the second section of pipe 162.

Second, with frame of reference of FIG. 14, as the output member 157 crosswise pin 210 moves from right to left in a retracting motion, the linkage 250 moves from right to left. As the linkage 250 moves left, the first clamping jaw 306 pivots counterclockwise about the pivot point 322 until the jaw portion 310 releases the first section of pipe 170, at which point the first and second clamping jaws 306, 318 pivot counterclockwise about the coupling point 286. Thus, the clamping force on the first section of pipe 170 is released, such that the first section of pipe 170 is not rotated in a tightening direction with respect to the second section of pipe 162 during retraction of the crosswise pin 210.

Figure 15:
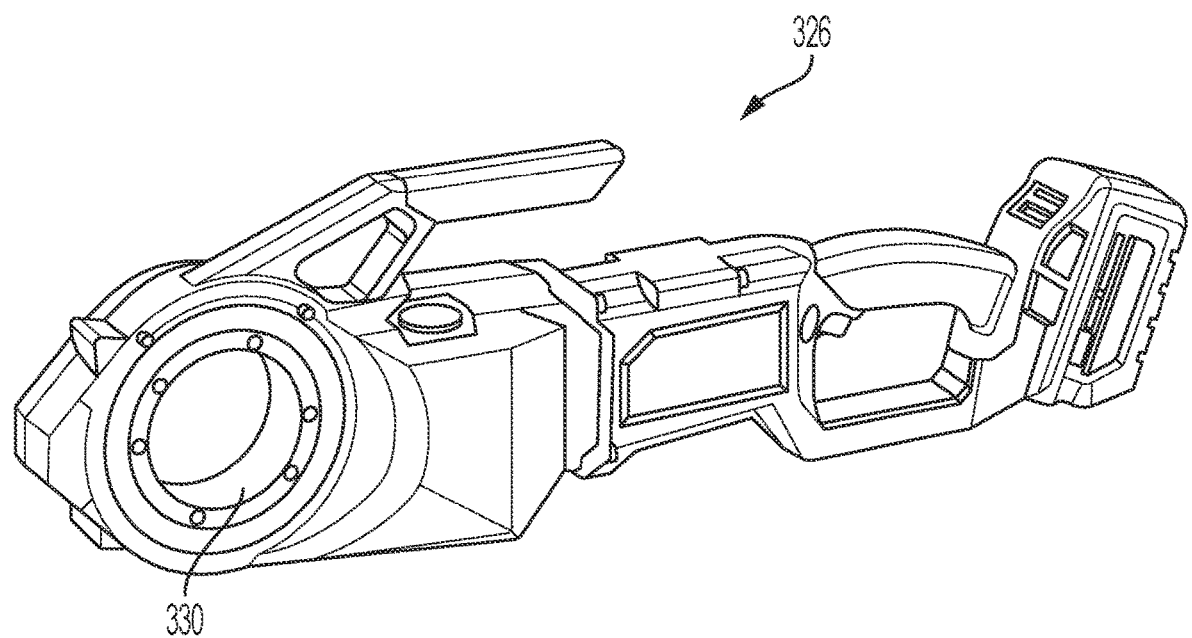
FIG. 15 is a perspective view of a pipe threader.
Figure 16:
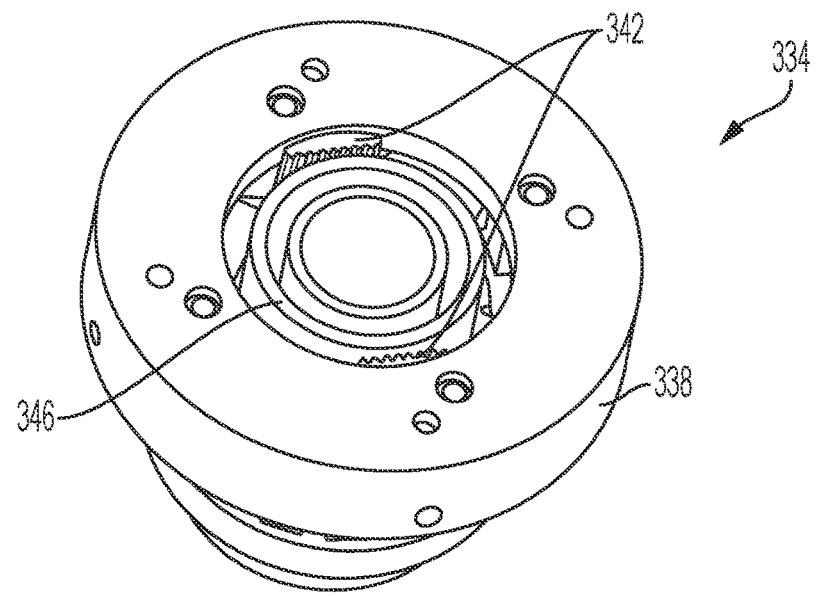
FIG. 16 is a perspective view of a loosening member for use with the pipe threader of FIG. 15 to forma pipe fitting tool.

FIG. 15 illustrates a pipe threader 326 with a gear 330 for providing rotation to a loosening member 334 shown in FIG. 16. The pipe loosening member 334 includes a body 338 and a plurality of clamping members 342. In operation, the pipe loosening member 334 is mounted to the gear 330 and axially slipped onto a first section of pipe 346. The pipe threader 326 is then activated to rotate the gear 330. Rotation of the gear 330 causes the pipe loosening member 334 to rotate as well, and causes the clamping members 342 to cam inwards and clamp onto the first section of pipe 346, thereby loosening it with respect to a second section of pipe.

Figure 17:
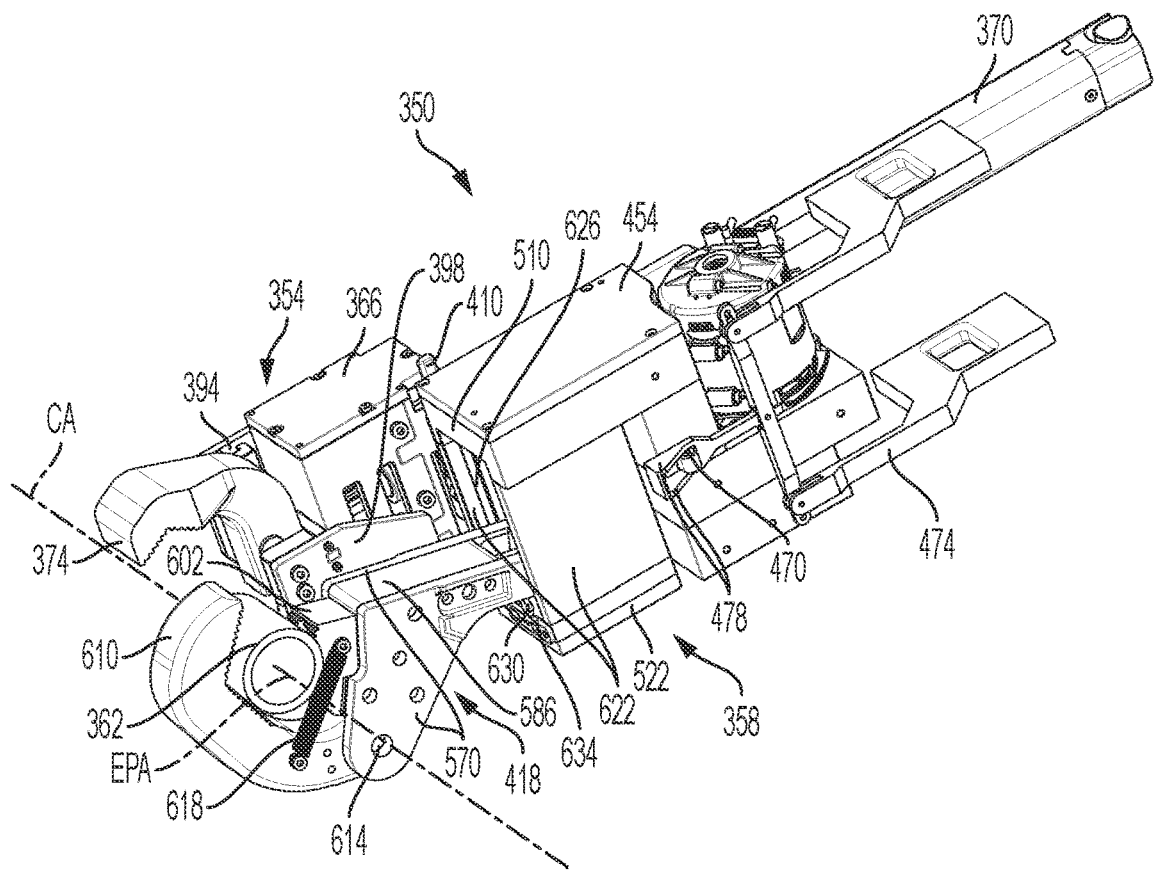
FIG. 17 is a perspective view of a pipe fitting tool according to another embodiment.

FIG. 17 illustrates a pipe fitting tool 350 including a holdback assembly 354 configured to clamp and hold a second section of pipe (not shown), and a drive assembly 358 configured to loosen a first section of pipe 362 with respect to the second section of pipe, as explained in further detail below.

Figure 18:
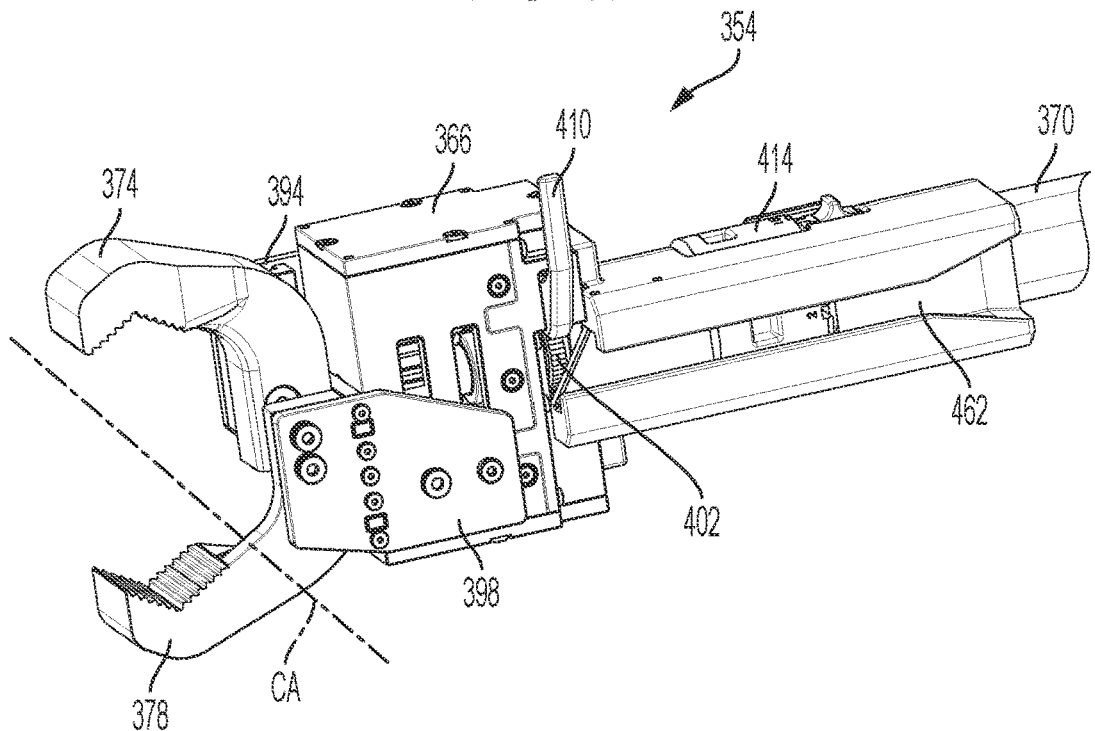
FIG. 18 is a perspective view of a holdback assembly of the pipe fitting tool of FIG. 17.
Figure 19:
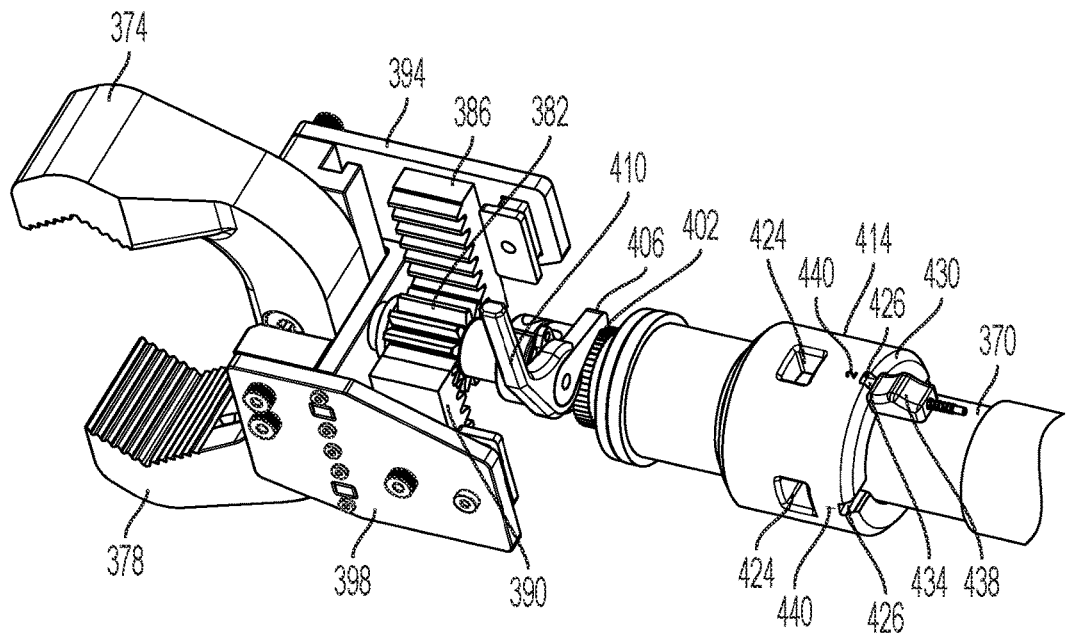
FIG. 19 is a perspective view of a holdback assembly of the pipe fitting tool of FIG. 17, with portions removed for clarity.
Figure 20:
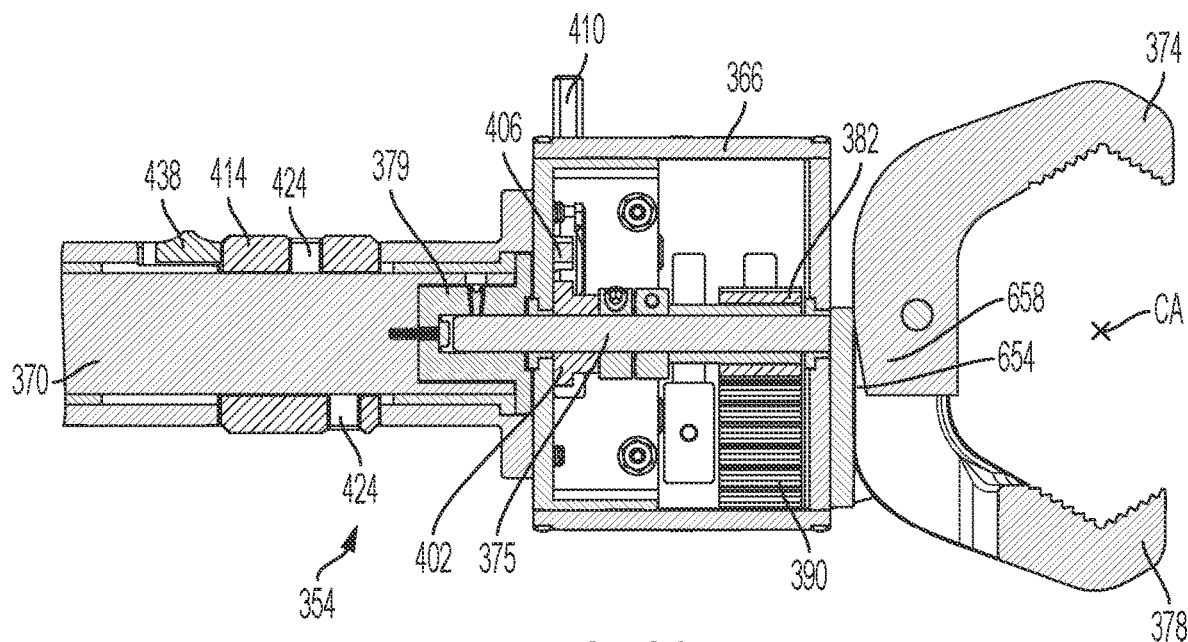
FIG. 20 is a cross-sectional view of the holdback assembly of the pipe fitting tool of FIG. 17.

As shown in FIGS. 18-20, the illustrated holdback assembly 354 includes a housing 366, a handle 370, and first and second jaws 374, 378 that open and close in response to rotation of the handle 370. Specifically, as shown in FIG. 20, the handle 370 is coupled to a driveshaft 375 via a coupling member 379. A pinion 382 is coupled for rotation with the driveshaft 375 and is meshingly engaged with a first rack 386 and a second rack 390, such that rotation of the pinion 382 causes the first and second racks 386, 390 to move in opposite directions with respect to one another (FIG. 19). The first jaw 374 is coupled to the first rack 386 via a first plate 394 and the second jaw 378 is coupled to the second rack 390 via a second plate 398. When the first and second jaws 374, 378 are clamped on the second section of pipe, a central axis CA of the second section of pipe is positioned between the first and second jaws 374, 378 (FIG. 18).

With reference to FIGS. 19 and 20, a ratchet wheel 402 is coupled for rotation with the driveshaft 375 and a pawl 406 is biased to engage the ratchet wheel 402. When the pawl 406 is engaged against the ratchet wheel 402, the pawl 406 inhibits the ratchet wheel 402, and thus the driveshaft 375, from rotating in a loosening direction. However, while the pawl 406 is engaged against the ratchet wheel 402, the pawl 406 is configured to allow the ratchet wheel 402, and thus the driveshaft 375, to rotate in a tightening direction. The pawl 406 is coupled for pivotal movement with a release handle 410, thus allowing the pawl 406 to pivot with the release handle 410 between an engaged position, in which the pawl 406 is engaged against the ratchet wheel 402, and a disengaged position, in which the pawl 406 is disengaged from the ratchet wheel 402.

The illustrated holdback assembly 354 also includes an adjustment collar 414 for adjusting a position of the drive assembly 358 with respect to the holdback assembly 354, to thereby ensure that an effective pivot axis EPA of a jaw assembly 418 of the drive assembly 358 is coaxial with the central axis CA of the second section of pipe, while the first and second jaws 374, 378 are clamped on the second section of pipe and the jaw assembly 418 is positioned on the first section of pipe 362. Referring to FIG. 19, the adjustment collar 414 includes a plurality of radial recesses 424 corresponding to a plurality of parallel positions of the drive assembly 358 with respect to the holdback assembly 354, as explained in further detail below. Each radial recess 424 may also correspond to a predetermined diameter of pipe that is to be loosened by the jaw assembly 418 of the drive assembly 358. Thus, each radial recess 424 is axially and rotationally offset from each other radial recess 424 along the adjustment collar 414.

A plurality of detents 426, which may be configured as projections, recesses, or both, is arranged at an end 430 of the adjustment collar 414. Each detent 426 corresponds to one of the radial recesses 424 and is configured to receive a finger 434 of a sliding release actuator 438, which is biased toward the adjustment collar 414. In the illustrated embodiment, there are four corresponding pairs of radial recesses 424 and detents 426, respectively corresponding to four standard pipe diameters: (1) 1 inch; (2) 1¼ inches; (3) 1½ inches; and (4) 2 inches. Thus, the pipe fitting tool 350 may be conveniently and quickly set up to interface with four different standard sizes of pipes. However, in other embodiments, there could be more or fewer corresponding pairs of radial recesses 424 and detents 426, to provide more or fewer different preset sizes. In the illustrated embodiment, the adjustment collar 414 includes a plurality of indicia 440 adjacent each detent 426 to make apparent which pipe diameter has been selected by the adjustment collar 414.

Figure 21:
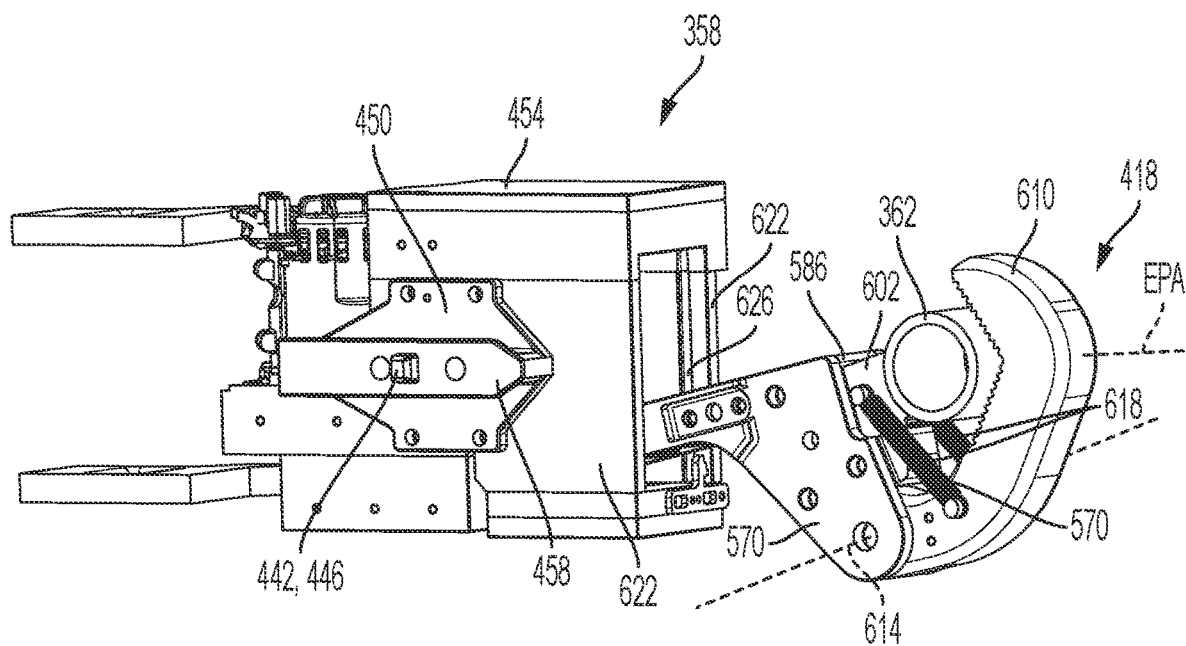
FIG. 21 is a perspective view of a drive assembly of the pipe fitting tool of FIG. 17.
Figure 22:
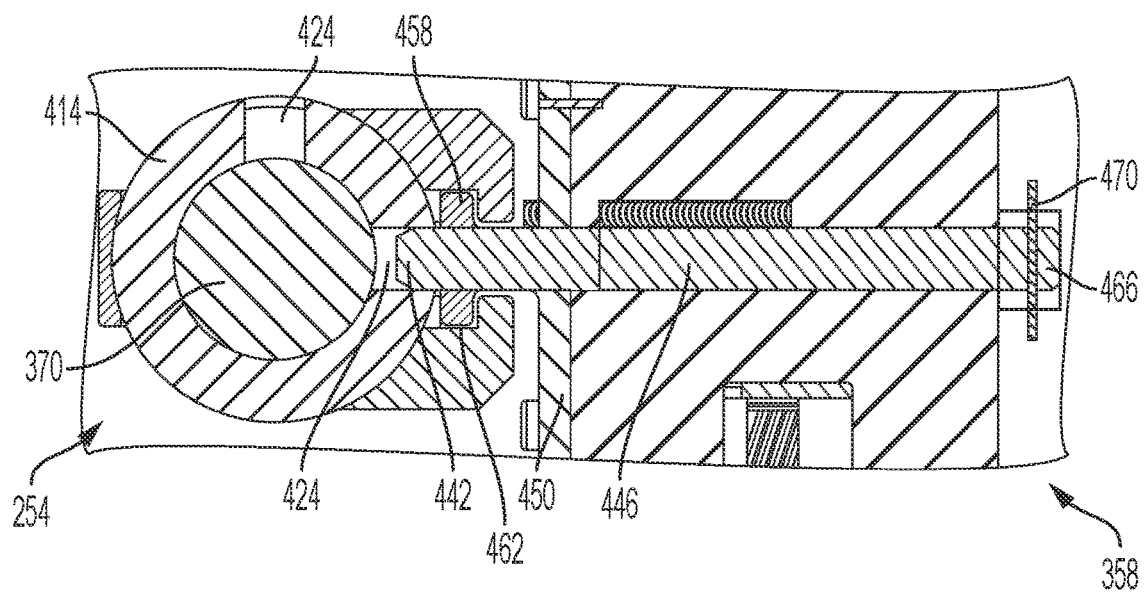
FIG. 22 is a cross-sectional view of a portion of the drive assembly of the pipe fitting tool of FIG. 17.

Each radial recess 426 has a rectangular cross-sectional area, such that each radial recess is configured to receive a first end 442 of a crossbar 446 that extends through the drive assembly 358, as shown in FIGS. 21 and 22. The crossbar 446 may be biased toward the adjustment collar 414. A bracket 450 coupled to a housing 454 of the drive assembly 358 includes a sliding potion 458 configured to be received in a track 462 (FIG. 18) on the housing 366 of the holdback assembly 354. In the illustrated embodiment, each detent 426 and its adjacent indicia 440 correspond to the radial recess 424 that is rotationally offset by 90 degrees, such that when the finger 434 is in a particular detent 426, its corresponding radial recess 424 is arranged in the track 462. As shown in FIG. 22, the crossbar 446 extends through the housing 454 and the bracket 450. By arranging the sliding portion 458 in the track 462, the drive assembly 358 is inhibited from moving in a direction parallel to the crossbar 446 with respect to the holdback assembly 354, but may slide in a direction perpendicular to the crossbar 446 with respect to the holdback assembly 354 as long as the first end 442 of the crossbar 446 is not received in one of the radial recesses 424.

As shown in FIG. 17, a pin 470 extends through the crossbar 446 proximate the second end 466 of the crossbar 446. The illustrated pipe fitting tool 350 includes a linkage 474, which may be moved away from the jaw assembly 418 of the drive assembly 358 along the housing 454. The linkage 474 has ramps 478 to engage the pin 470 and move it away from the side of the housing 454. As the pin 470 is moved away from the housing 454, the crossbar 446 is moved away from the adjustment collar 414, and the first end 442 of the crossbar 446 is moved out of one of the radial recesses 424. After the first end 442 has been removed from one of the radial recesses 424, the drive assembly 358 may be adjusted in a parallel manner with respect to the holdback assembly 354 by sliding the sliding portion 458 (FIG. 21) along the track 462 (FIG. 17).

The release actuator 438 may then by moved and held away from the adjustment collar 414 to remove the finger 434 from one of the detents 426, at which point the adjustment collar 414 can be rotated to a new rotational position corresponding to a new pipe diameter, thus aligning a new radial recess 424 with the track 462. The release actuator 438 may then be released and be biased back into a different detent 426 corresponding to the new radial recess 424 that is aligned with the track 462, and thereby inhibiting the adjustment collar 414 from rotation. The linkage 474 may then be released, allowing the crossbar 446 to be biased back toward the adjustment collar 414 until the first end 442 enters the new radial recess 424. The drive assembly 358 is thereby set in a new parallel position, corresponding to a new pipe diameter, with respect to the holdback assembly 354.

Figure 23:
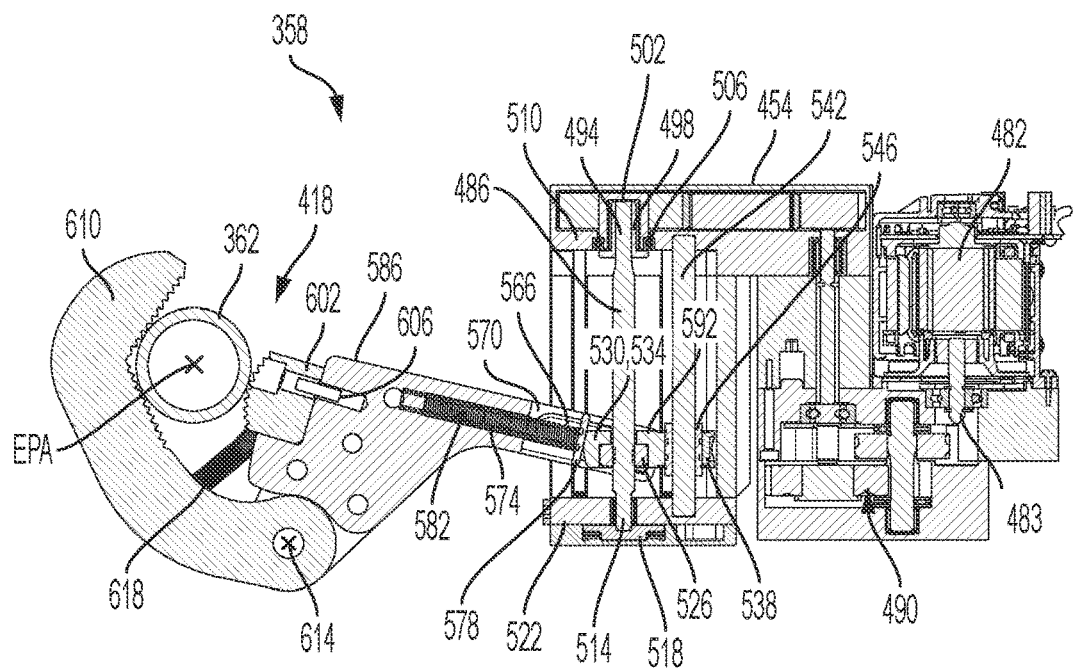
FIG. 23 is a cross-sectional view of the drive assembly of the pipe fitting tool of FIG. 17.

With reference to FIG. 23, the illustrated drive assembly 358 includes an electric motor 482, a lead screw 486, and gear train 490 to transfer torque from the motor 482 to the lead screw 486. The electric motor 482 is preferably powered by a battery removably coupled to the housing 454, such as the battery 172 described above with reference to FIG. 9. In the illustrated embodiment, an output shaft 483 of the motor extends parallel to the lead screw 486.

Specifically, a first end 494 of the lead screw 486 is arranged in and coupled for rotation with a drive member 498. The drive member 498 is configured to rotate with a torque transfer member 502 coupled for rotation with a gear 504 of the gear train 490, via a Double-D cross-sectional geometry, but is configured to move axially with respect to the torque transfer member 502. A thrust bearing 506 is arranged around the torque transfer member 502 and is set in an upper portion 510 of the housing 454. Because the drive member 498 is configured to move axially with respect to the torque transfer member 502, the axial thrust force received by the gear 504 is reduced, thus preventing the gear 504 from binding. A second end 514 of the lead screw 486 is arranged in a thrust bearing 518 in a lower portion 522 of the housing 454. In some embodiments, the thrust bearing 518 is configured to absorb up to 3,000 lb of thrust load exerted by the lead screw 486 on the thrust bearing 518 during a pipe loosening operation.

With continued reference to FIG. 23, a nut 526 is threadably arranged for movement along the lead screw 486. The nut 526 is captured within a first end 530 of a carriage 534 that also has a second end 538 arranged around and configured to move along a post 542 in the housing 454, via a sleeve 546 (e.g., a low-friction sleeve, linear bearing, or the like). Because the carriage 534 is arranged on the lead screw 486 (via the nut 526) and the post 542 (via the sleeve 546), the carriage 534 is inhibited from rotating within the housing 454, and is only capable of moving between the upper and lower portions 510, 522 of the housing 454. Because the nut 526 is captured within the carriage 534, the nut 526 is inhibited from rotating about the lead screw 486. Thus, in response to rotation of the lead screw 486, the nut 526 will move along the lead screw 486 between the upper and lower portions 510, 522 of the housing 454, causing the carriage 534 to move therewith.

Figure 24:
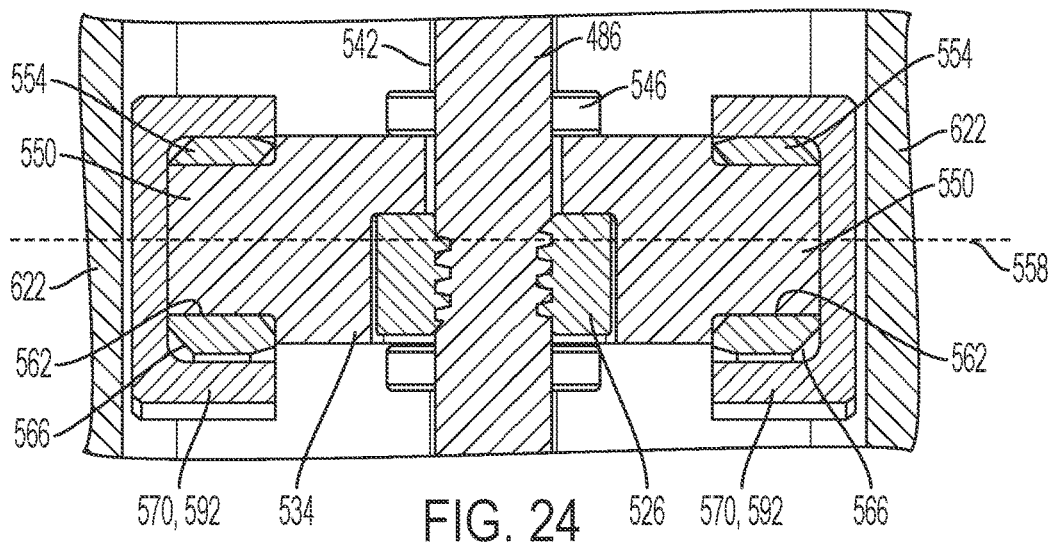
FIG. 24 is an enlarged cross-sectional view of a portion of the drive assembly of the pipe fitting tool of FIG. 17.

As shown in FIG. 24, the carriage 534 has two hubs 550 on which a pair of sleds 554 are respectively arranged. The hubs 550 define a hub axis 558, which extends centrally through the hubs 550, and each of the sleds 554 has a recess 562 (FIG. 25) to accommodate a respective one of the hubs 550. Each of the sleds 554 is respectively arranged in a slot 566 of one of a pair of lever supports 570, such that the sleds 554 may move along the slots 566 during a pipe loosening operation, as discussed in further detail below. The jaw assembly 418 of the drive assembly 358 includes the lever supports 570, a lever arm 586 coupled between the lever supports 570, a first jaw 602 coupled to the lever arm 586, and a second jaw 610 pivotally coupled to each of the lever supports 570 along a common pivot axis 614 (FIG. 23).

Figure 25:
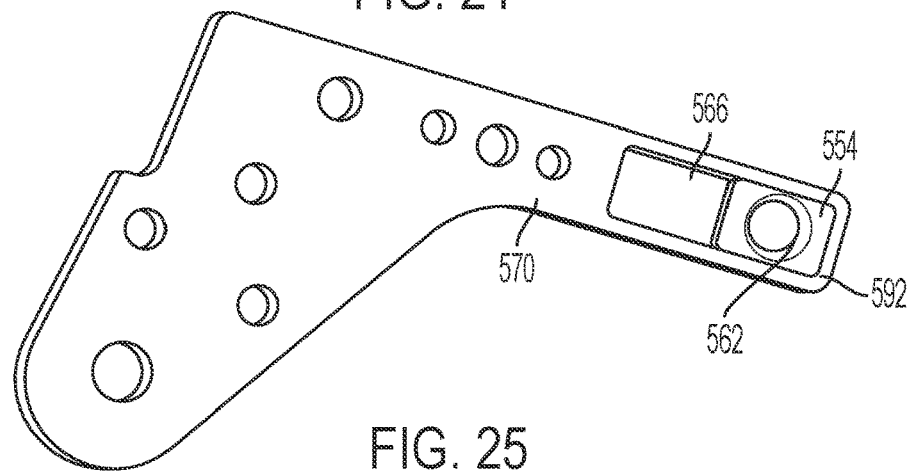
FIG. 25 is a perspective view of a lever support and sled of the drive assembly of the pipe fitting tool of FIG. 17.
Figure 26:
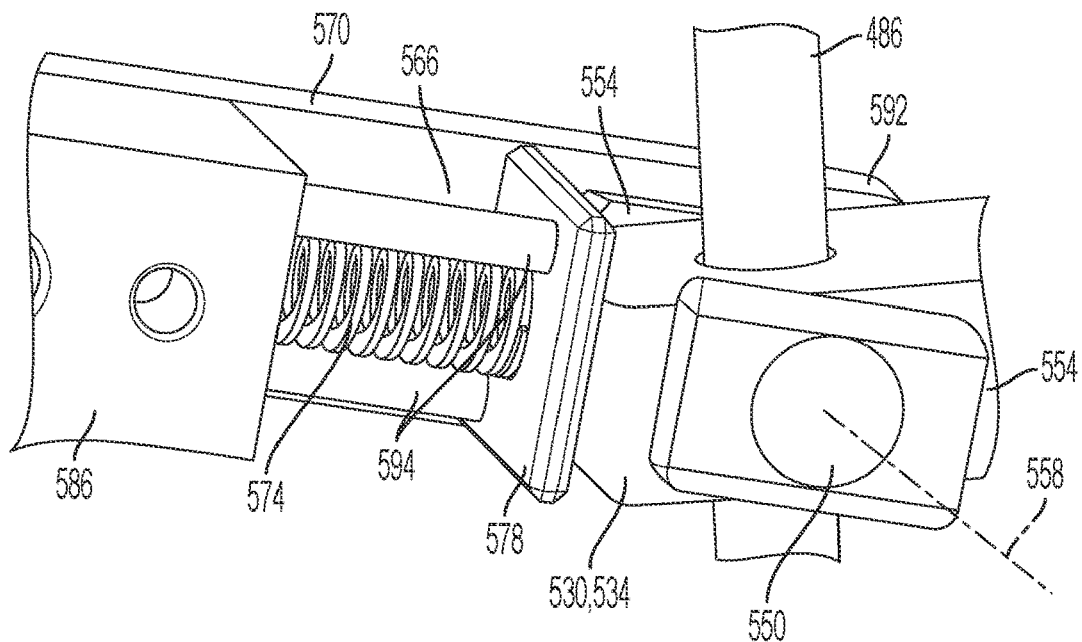
FIG. 26 is an enlarged perspective view of a portion of the drive assembly of FIG. 21, with portions removed for clarity.

As shown in FIGS. 23 and 26, a spring 574 is seated against a spring slider 578 and arranged within a bore 582 of the lever arm 586. The spring slider 578 thus is biased by the spring 574 against the carriage 534. The lever arm 586 and both lever supports 570 are thus biased by the spring 574 away from the spring slider 578 and toward the first section of pipe 346, such that in a neutral position the sleds 554 are arranged in the slots 566 toward ends 592 of the lever supports 570 (FIG. 25).

A pair of pins 594 extend from the spring slider 578 and into the lever arm 586 to inhibit the spring slider 578 from rotating with respect to the lever arm 586 (FIG. 26). As shown in FIG. 23, the first jaw 602 is removably coupled to the lever arm 586 via, for example, a fastener 606, such that different types of jaw pieces or replacement jaw pieces may replace the first jaw 602 on the lever arm 586.

Figure 27:
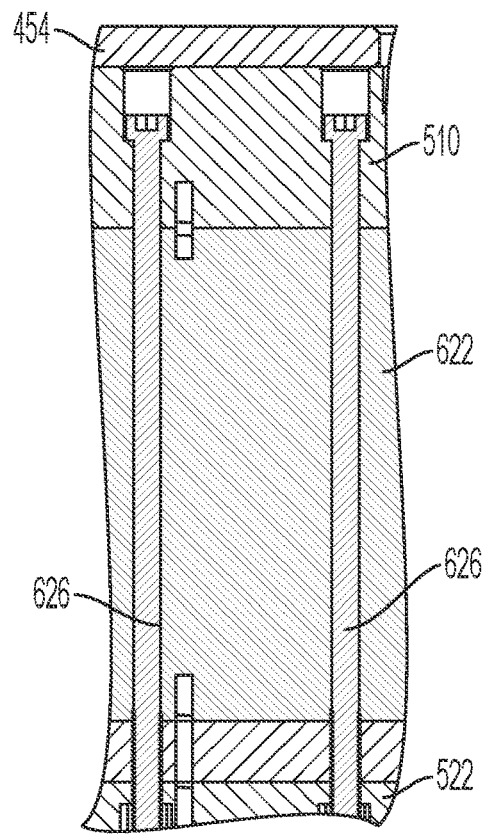
FIG. 27 is a cross-sectional view of the portion of the drive assembly of FIG. 26.

The second jaw 610 is biased toward the first jaw 602 via a pair of tension springs 618 coupled between the first and second jaws 602, 610. As shown in FIG. 27, a side portion 622 extends between the upper and lower portions 510, 522 of the housing 454 on opposite sides of the carriage 534. A pair of steel bolts 626 respectively extend through each of the side portions 622, coupling the upper and lower portions 510, 522 of the housing 454.

Figure 28:
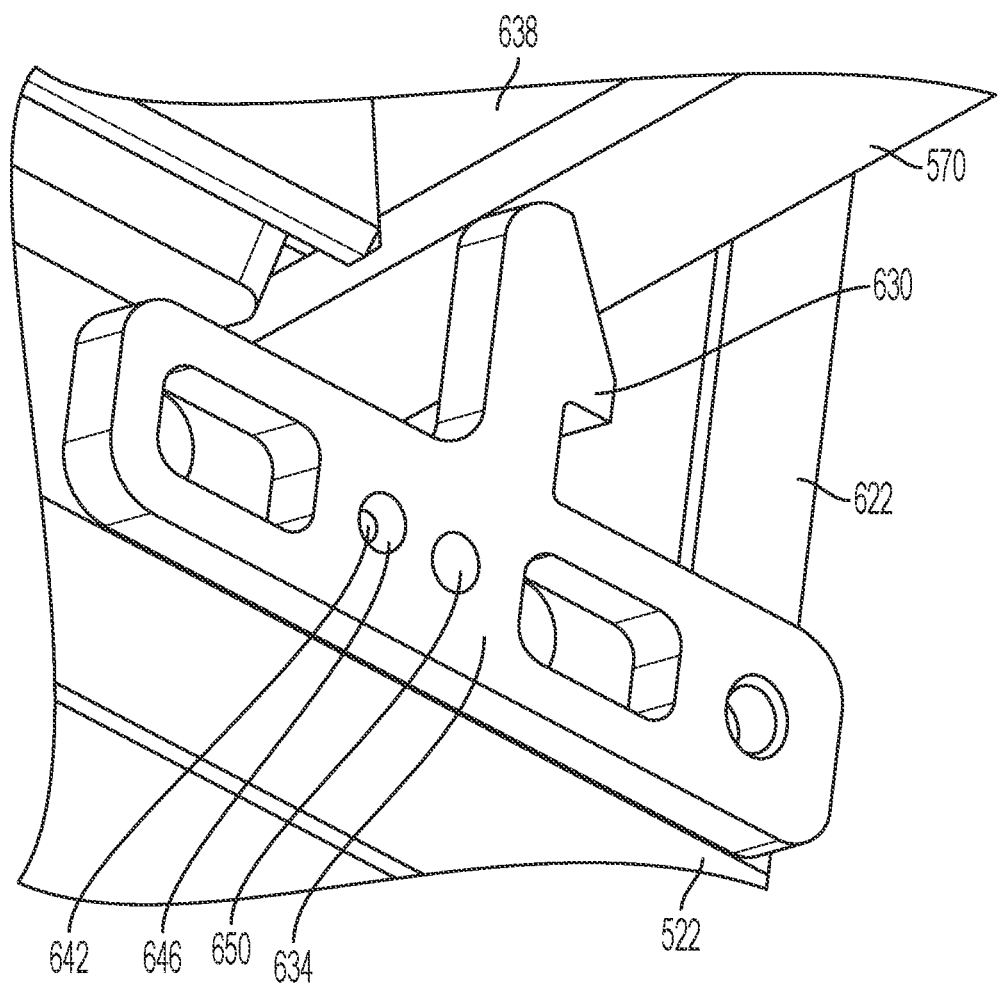
FIG. 28 is an enlarged perspective view of a portion of the drive assembly of FIG. 21.

As shown in FIG. 28, a storage hook 630 on a slide member 634 is configured to hook onto a ledge 638 of one of the lever supports 570, thus hooking the jaw assembly 418 in a fixed storage position with respect to the housing 454, when the slide member 634 is locked in a first position via a detent 642 being biased into a first recess 646. The detent 642 can be depressed and the slide member 634 is slidable along the housing 454 to an unlocked position, in which the detent 642 is biased into a second recess 650, and the storage hook 630 releases the ledge 638, allowing the jaw assembly 418 to swing back to an operating position. By putting the jaw assembly 418 in a storage position during transport of the pipe fitting tool 350, damage to the jaw assembly 418 during transport can be prevented, as opposed to allowing the jaw assembly 418 to swing freely with respect to the housing 454.

In operation, after the drive assembly 358 has been set in the correct parallel position with respect to the holdback assembly 354 for a size of a particular pipe to be loosened, as described above, the first and second jaws 602, 610 of the jaw assembly 418 are positioned on the first section of pipe 346 while the first and second jaws 374, 378 of the holdback assembly 354 are positioned on opposite sides of the second section pipe. The handle 370 of the holdback assembly 354 is then rotated in a tightening direction, thus rotating the driveshaft 375 in a tightening rotation. In response to the driveshaft 375 rotating in a tightening direction, the pinion 382 rotates to move the first and second racks 386, 390 in opposite directions, such that the first and second jaws 374, 378 move toward each other to clamp down on the second section of pipe. Once the first and second jaws 374, 378 are clamped on the second section of pipe, the engagement of the pawl 406 against the ratchet wheel 402 inhibits the jaws 374, 378 from moving away from their clamped position.

The motor 482 of the drive assembly 358 is then activated in a loosening direction, causing the lead screw 486 to rotate in a loosening direction. Rotation of the lead screw 486 in the loosening direction causes the carriage 534 to move toward the upper portion 510 of the housing 454, causing the ends 592 of the lever supports 570 to also move with the carriage 534. As the ends 592 of the lever supports 570 move with the carriage 534 toward the upper portion 510, the first and second jaws 602, 610 of the drive assembly 358 rotate in a loosening direction about the effective pivot axis EPA (i.e. counterclockwise as viewed in FIGS. 17 and 23), which is coaxial with the central axis CA defined by the second section of pipe, while clamping on the first section of pipe 346, thus loosening the first section of pipe 346 with respect to the second section of pipe that is being held by the first and second jaws 374, 378 of the holdback assembly 354. As the first and second jaws 590, 610 rotate in the loosening direction, the sleds 554 simultaneously rotate about the hubs 550.

As the first section of pipe is being loosened, the grip of the first and second jaws 374, 378 on the second section of pipe is amplified because the first jaw 374 is able to pivot slightly, in a manner similar to a pipe wrench, via a gap 654 (FIG. 20) at an inner end 658 of the first jaw 374. While the lead screw 486 is rotating in the loosening direction, the force exerted on the housing 454 by the lead screw 486 is transferred through the steel bolts 626, in tension, between the upper and lower portions 510, 522 of the housing 454. In absence of the steel bolts 626, the stress would be exerted on the housing 454 itself, which, being formed of aluminum, would be less suited to take the stress.

After the motor 482 has rotated a predetermined amount in the loosening direction, the motor 482 reverses direction and rotates in an opposite, return direction, causing the lead screw 486 to rotate in an opposite, return direction. Rotation of the lead screw 486 in the return direction causes the carriage 534 to move toward the lower portion 522 of the housing 454, causing the ends 592 of the lever supports 570 to also move with the carriage 534. As the ends 592 of the lever supports 570 move with the carriage 534 toward the lower portion 522, the first and second jaws 602, 610 of the drive assembly 358 rotate in a return direction (i.e. clockwise as viewed in FIGS. 17 and 23) about the first section of pipe 346. However, while rotating in the return direction, the second jaw 610 is permitted to pivot away from the first jaw 590, such that the first and second jaws 590, 610 do not clamp on the first section of pipe 346 while rotating in the return direction, such that the first section of pipe 346 is not "re-tightened" during a return movement. As the first and second jaws 602, 610 rotate in the return direction, the sleds 554 simultaneously rotate about the hubs 550 and move along the slots 566.

After the motor 482 has rotated a predetermined amount in the return direction, the motor 482 thereafter repeatedly executes "loosening" and "return" rotation cycles until the first section of pipe 346 has become loosened with respect to the second section of pipe. When the operator is satisfied, the operator uses the release handle 410 to disengage the pawl 406 from the ratchet wheel 402 and rotates the handle 370 in a loosening direction to unclamp the first and second jaws 374, 378 of the holdback assembly 354 from the second section of pipe.

Various features and aspects of the invention are set forth in the following claims.

What is claimed is:

1. A pipe fitting tool configured to loosen a first section of pipe with respect to a second section of pipe, the pipe fitting tool comprising:
    a motor;
    a housing containing the motor;
    a battery removably coupled to the housing, the battery configured to provide power to the motor;
    a reciprocating member that reciprocates in response to activation of the motor;
    a holdback assembly including holdback assembly jaws that are actuatable to move the holdback assembly jaws toward and away from each other to clamp and hold the second section of pipe; and
    a loosening mechanism configured to
        clamp and rotate the first section of pipe with respect to the second section of pipe in response to a first linear motion of the reciprocating member, and
        release the first section of pipe in response to a second linear motion of the reciprocating member, the second linear motion being in a direction opposite the first linear motion.

2. The pipe fitting tool of claim 1, wherein the holdback assembly jaws are a first pair of jaws, and wherein the loosening mechanism includes a second pair of jaws.

3. The pipe fitting tool of claim 2, wherein the holdback assembly is adjustably positioned relative to the loosening mechanism.

4. The pipe fitting tool of claim 1, wherein the loosening mechanism includes a screw rotatably driven by the motor to clamp and rotate the first section of pipe.

5. A pipe fitting tool configured to loosen a first section of pipe with respect to a second section of pipe, the pipe fitting tool comprising:
    a motor;
    a lead screw configured to rotate in response to receiving torque from the motor;
    a carriage configured to move along the lead screw between a first position and a second position in response to rotation of the lead screw;
    a holdback assembly configured to clamp and hold the second section of pipe; and
    a jaw assembly configured to
        clamp and rotate the first section of pipe with respect to the second section of pipe in response to movement of the carriage from the first position to the second position, and
        release the first section of pipe in response to movement of the carriage from the second position to the first position.

6. The pipe fitting tool of claim 5, wherein the holdback assembly includes a first jaw and a second jaw movable relative to the first jaw.

7. The pipe fitting tool of claim 6, wherein the holdback assembly includes a handle, and wherein a spacing between the first jaw and the second jaw is decreased in response to movement of the handle to clamp and hold the second section of pipe.

8. The pipe fitting tool of claim 7, wherein the holdback assembly includes a drive shaft coupled to the handle and a pinion coupled for co-rotation with the drive shaft, wherein the drive shaft is configured to rotate in response to movement of the handle.

9. The pipe fitting tool of claim 8, wherein the holdback assembly includes a first rack gear meshed with the pinion and coupled to the first jaw and a second rack gear meshed with the pinion and coupled to the second jaw such that rotation of the pinion causes the first and second jaws to move in opposite directions.

10. The pipe fitting tool of claim 5, further comprising a removable battery configured to power the motor.

11. The pipe fitting tool of claim 5, wherein the jaw assembly includes a first jaw and a second jaw movable relative to the first jaw, and wherein the first jaw is biased toward the second jaw.

12. The pipe fitting tool of claim 5, wherein the holdback assembly is adjustably positionable relative to the jaw assembly.

13. The pipe fitting tool of claim 12, wherein the holdback assembly includes a track to guide movement of the jaw assembly relative to the holdback assembly.

14. The pipe fitting tool of claim 5, further comprising a post extending parallel to the lead screw, wherein the carriage includes a sleeve slidable along the post to guide movement of the carriage.

15. The pipe fitting tool of claim 5, wherein the motor includes an output shaft extending parallel to the lead screw.

16. A method of loosening a first section of pipe with respect to a second section of pipe, the method comprising:

positioning first and second jaws of a holdback assembly on opposite sides of the second section of pipe;

positioning third and fourth jaws of a drive assembly on opposite sides of the first section of pipe;

rotating a handle of the holdback assembly in a tightening direction to move the first and second jaws toward each other to clamp the second section of pipe between the first and second jaws; and performing a loosening operation including
    activating a motor of the drive assembly in a loosening direction to cause the third and fourth jaws to clamp the first section of pipe between the third and fourth jaws; and
    continuing to operate the motor in the loosening direction to cause the third and fourth jaws to rotate the first section of pipe relative to the second section of pipe.

17. The method of claim 16, further comprising performing a resetting operation after the loosening operation, the resetting operation including reversing an operating direction of the motor to cause the third and fourth jaws to release the first section of pipe.

18. The method of claim 17, further comprising repeating the loosening operation after the resetting operation.

19. The method of claim 16, wherein rotating the handle of the holdback assembly includes rotating a pinion meshed with a first rack coupled to the first jaw and a second rack coupled to the second jaw.

* * * * *